US009558469B2

(12) United States Patent
Lord et al.

(10) Patent No.: US 9,558,469 B2
(45) Date of Patent: Jan. 31, 2017

(54) SYSTEM AND METHODS FOR VERIFYING THAT ONE OR MORE END USER TRANSPORT DIRECTIVES DO NOT CONFLICT WITH ONE OR MORE PACKAGE DELIVERY DIRECTIVES

(71) Applicant: Elwha LLC, Bellevue, WA (US)

(72) Inventors: Richard T. Lord, Gig Harbor, WA (US); Robert W. Lord, Seattle, WA (US); Nathan P. Myhrvold, Medina, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/537,313

(22) Filed: Nov. 10, 2014

(65) Prior Publication Data

US 2015/0324735 A1 Nov. 12, 2015

Related U.S. Application Data

(63) Continuation of application No. 14/536,967, filed on Nov. 10, 2014, and a continuation-in-part of application No. 14/318,182, filed on Jun. 27, 2014, and a continuation-in-part of application No. 14/329,451, filed on Jul. 11, 2014, which is a continuation of application No. 14/328,002, filed on Jul. 10, 2014, said application No. 14/536,967 is a continuation-in-part of application No. 14/456,627, filed on Aug. 11, 2014,
(Continued)

(51) Int. Cl.
*G06Q 10/08* (2012.01)

(52) U.S. Cl.
CPC ............ *G06Q 10/08* (2013.01); *G06Q 10/083* (2013.01)

(58) Field of Classification Search
CPC .................................................. G06Q 10/083
USPC ........................................................ 701/410
See application file for complete search history.

(56) References Cited

U.S. PATENT DOCUMENTS

| 5,802,492 A | 9/1998 | DeLorme et al. |
| 5,920,697 A | 7/1999 | Masters et al. |

(Continued)

OTHER PUBLICATIONS

Dillenburg et al.; "The Intelligent Travel Assistant"; The IEEE 5th International conference on Intelligent Transportation Systems; Sep. 3-6, 2002; pp. 691-696; IEEE.
(Continued)

*Primary Examiner* — Anne M Antonucci

(57) ABSTRACT

Computationally implemented methods and systems that are designed for receiving one or more package delivery directives that direct a transportation vehicle unit to deliver one or more packages; receiving one or more end user transport directives that direct the transportation vehicle unit to transport one or more end users; and verifying that the one or more end user transport directives do not conflict with the one or more package delivery directives such that transport of the one or more end users by the transportation vehicle unit in accordance with the one or more end user transport directives will not violate one or more package delivery obligations of the transportation vehicle unit to deliver the one or more packages in accordance with the one or more package delivery directives. In addition to the foregoing, other aspects are described in the claims, drawings, and text.

38 Claims, 24 Drawing Sheets

Related U.S. Application Data which is a continuation of application No. 14/455,534, filed on Aug. 8, 2014, said application No. 14/536,967 is a continuation-in-part of application No. 14/476,042, filed on Sep. 3, 2014, which is a continuation of application No. 14/474,587, filed on Sep. 2, 2014, said application No. 14/536,967 is a continuation-in-part of application No. 14/511,706, filed on Oct. 10, 2014, which is a continuation of application No. 14/510,383, filed on Oct. 9, 2014.

(60) Provisional application No. 61/989,394, filed on May 6, 2014.

(56) References Cited

U.S. PATENT DOCUMENTS

| | | | |
|---|---|---|---|
| 6,321,158 | B1 | 11/2001 | DeLorme et al. |
| 7,312,712 | B1 | 12/2007 | Worrall et al. |
| 7,840,427 | B2 | 11/2010 | O'Sullivan |
| 7,957,871 | B1 | 6/2011 | Echeruo |
| 8,626,366 | B2 | 1/2014 | Noffsinger et al. |
| 8,688,532 | B2 | 4/2014 | Khunger et al. |
| 8,775,070 | B1 | 7/2014 | Bhatia |
| 8,831,677 | B2 | 9/2014 | Villa-Real |
| 2002/0186144 | A1 | 12/2002 | Meunier |
| 2003/0040944 | A1* | 2/2003 | Hileman ............... G06Q 10/02 705/5 |
| 2009/0005963 | A1 | 1/2009 | Jarvinen |
| 2009/0248587 | A1 | 10/2009 | Van Buskirk |
| 2010/0280884 | A1 | 11/2010 | Levine et al. |
| 2010/0332131 | A1 | 12/2010 | Horvitz et al. |
| 2011/0059693 | A1 | 3/2011 | O'Sullivan |
| 2011/0257883 | A1 | 10/2011 | Kuznetsov |
| 2011/0288762 | A1 | 11/2011 | Kuznetsov |
| 2012/0041675 | A1 | 2/2012 | Juliver et al. |
| 2012/0112696 | A1 | 5/2012 | Ikeda et al. |
| 2012/0253654 | A1* | 10/2012 | Sun ............................. 701/409 |
| 2013/0054139 | A1 | 2/2013 | Bodin et al. |
| 2013/0131909 | A1 | 5/2013 | Cooper et al. |
| 2013/0158861 | A1 | 6/2013 | Lerenc |
| 2013/0158869 | A1 | 6/2013 | Lerenc |
| 2013/0226365 | A1 | 8/2013 | Brozovich |
| 2014/0094998 | A1 | 4/2014 | Cooper et al. |
| 2014/0173511 | A1 | 6/2014 | Lehmann et al. |
| 2015/0006005 | A1 | 1/2015 | Yu et al. |
| 2015/0006072 | A1 | 1/2015 | Goldberg et al. |
| 2015/0019132 | A1 | 1/2015 | Gusikhin et al. |
| 2015/0025932 | A1 | 1/2015 | Ross et al. |
| 2015/0278759 | A1 | 10/2015 | Harris et al. |
| 2015/0294431 | A1 | 10/2015 | Fiorucci |
| 2015/0323333 | A1 | 11/2015 | Lord et al. |
| 2015/0323336 | A1 | 11/2015 | Lord et al. |
| 2015/0324717 | A1 | 11/2015 | Lord et al. |
| 2015/0324729 | A1 | 11/2015 | Lord et al. |
| 2015/0324944 | A1 | 11/2015 | Lord et al. |
| 2015/0324945 | A1 | 11/2015 | Lord et al. |
| 2015/0325128 | A1 | 11/2015 | Lord et al. |

OTHER PUBLICATIONS

Guc et al.; "Real-time, Scalable Route Planning using a Stream-Processing Infrastructure"; 2010 13th International IEEE Annual Conference on Intelligent Transportation Systems; Sep. 19-22, 2010; pp. 986-991; IEEE.

Lalos et al.; "A Framework for dynamic car and taxi pools with the use of Positioning Systems"; 2009 Computation World: Future Computing, Service Computation, Cognitive, Adaptive, Content, Patterns; bearing a date of 2009; pp. 385-391; IEEE Computer Society.

Shahzada et al.; "Dynamic Vehicle Navigation: An A Algorithm Based Approach Using Traffic and Road Information"; 2011 International Conference on Computer Applications and Industrial Electronics; bearing a date of 2011; pp. 514-518; IEEE.

Boufraied, Amine; "A Diagnostic Approach for Advanced Tracking of Commercial Vehcles With Time Window Constraints"; IEEE Transaction on Intelligent Transportation Systems; bearing a date of Sep. 2013; pp. 1470-1479; vol. 14, No. 3; IEEE.

Fougeres et al; "A Push Service for Carpooling"; bearing a date of 2012 (created on Dec. 8, 2015); IEEE; 2012 IEEE International Conference on Green Computing and Communications, Conference on Internet of Things, and Conference on Cyber, Physical and Social Computing; pp. 685-691; IEEE Computer Society.

Megalingam et al; "Automated Wireless Carpooling System for an Eco-Friendly Travel"; bearing a date of 2011 (created on Dec. 8, 2015); IEEE; pp. 325-329.

Vaughn-Nichols, Steven J.; "Will Mobile Computing's Future be Location, Location, Location?"; IEEE; bearing a date of Feb. 2009; pp. 14-17; IEEE Computer Society.

Amey et al.; "'Real-Time' Ridesharing—The Opportunities and Challenges of Utilizing Mobile Phone Technology to Improve Rideshare Services"; Paper submitted to the 2011 Transporation Research Board Annual Meeting; bearing a date of Aug. 1, 2010; pp. 1-17.

* cited by examiner

202* Package Delivery Directive Receiving Module

302 Package Delivery Directive Network Receiving Module

304 Packgage Delivery Directive User Interface Receiving Module

306 Confirmation Transmitting Module

308 Directive Registering Module

FIG. 3A

204* Transport Directive Receiving Module

310 Transport Directive Network Receiving Module

312 End User Preference Data Receiving Module

314 Discount Transport Rate Data Receiving Module

316 End User Data Receiving Module

FIG. 3B

| Package Delivery Directives/Obligations – May 26, 3018 | | | | |
|---|---|---|---|---|
| Pkg No. | Pkg P/U Loc | Pkg Del Loc | Deadline | Pkg Del Pref |
| 001 | ACME Delivery Center | 2135 5th St. Seattle, WA 98134 | 11:30 AM | |
| 002 | ACME Delivery Center | 203 University Ave. Seattle, WA 98004 | | Fragile – No heavy package on top |
| 003 | ACME Delivery Center | 22346 116th AVE. Bellevue, WA 98026 | 3:00 PM | Air-conditioning |

↑350  ↑352  ↑354  ↑356  ↑358

FIG. 3E ( Start )

506 Verifying that the one or more end user transport directives do not conflict with the one or more package delivery directives such that transport of the one or more end users by the transportation vehicle unit in accordance with the one or more end user transport directives will not violate one or more package delivery obligations of the transportation vehicle unit to deliver the one or more packages in accordance with the one or more package delivery directives 843 Verifying that the one or more end user transport directives do not conflict with the one or more package delivery directives including identifying one or more outstanding package delivery obligations of the transportation vehicle unit that can be fulfilled during transport of the one or more end user by the transportation vehicle unit without violating one or more passenger transport requirements as defined by the one or more end user transport directives 844 Identifying one or more outstanding package delivery obligations of the transportation vehicle unit that can be fulfilled during transport of the one or more end user by identifying one or more outstanding package delivery obligations of the transportation vehicle unit that are yet to be fulfilled and that requires delivery of one or more packages to one or more package delivery locations that are determined as being along or proximate to a direct route for transporting, by the transportation vehicle unit, of the one or more end users from one or more rendezvous locations to one or more end user destination locations 845 Identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences related to transporting of the one or more end users as defined by the one or more end user transport directives 846 Identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences related to package deliveries during transport of the one or more end users 847 Identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences that no more than a predefined maximum number of package delivery or deliveries are permitted to be executed during transport of the one or more end users 848 Identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences that no more than a predefined maximum amount of time delay is permitted for transporting the one or more end users and as a result of delivering one or more packages during transport of the one or more end users ( End )

FIG. 8C

SYSTEM AND METHODS FOR VERIFYING THAT ONE OR MORE END USER TRANSPORT DIRECTIVES DO NOT CONFLICT WITH ONE OR MORE PACKAGE DELIVERY DIRECTIVES

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

Priority Applications

For purposes of the USPTO extra-statutory requirements, the present application constitutes a continuation of U.S. patent application Ser. No. 14/536,967, entitled SYSTEM AND METHODS FOR VERIFYING THAT ONE OR MORE END USER TRANSPORT DIRECTIVES DO NOT CONFLICT WITH ONE OR MORE PACKAGE DELIVERY DIRECTIVES, naming Richard T. Lord, Robert W. Lord, Nathan P. Myhrvold, and Clarence T. Tegreene as inventors, filed 10 Nov. 2014, which is currently co-pending or is an application of which a currently co-pending application is entitled to the benefit of the filing date.

For purposes of the USPTO extra-statutory requirements, the present application claims benefit of priority of U.S. Provisional Patent Application No. 61/989,394 titled RIDE-SHARING SCENARIOS, naming Richard T. Lord and Robert W. Lord as inventors, filed May 6, 2014, which was filed within the twelve months preceding the filing date of the present application or is an application of which a currently co-pending application is entitled to the benefit of the filing date.

The present application constitutes a continuation-in-part of U.S. patent application Ser. No. 14/318,182, entitled METHODS, SYSTEMS, AND DEVICES FOR PROVIDING TRANSPORTATION SERVICES, naming Richard T. Lord, Robert W. Lord, Nathan P. Myhrvold, and Clarence T. Tegreene, as inventors, filed Jun. 27, 2014.

The present application constitutes a continuation-in-part of U.S. patent application Ser. No. 14/329,451, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Jul. 11, 2014, which is currently co-pending or is an application of which a currently co-pending application is entitled to the benefit of the filing date, and which is a continuation of U.S. patent application Ser. No. 14/328,002, entitled SYSTEMS AND METHODS FOR TRAVEL PLANNING THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Jul. 10, 2014.

The present application constitutes a continuation-in-part of U.S. patent application Ser. No. 14/456,627, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Aug. 11, 2014, which is currently co-pending or is an application of which a currently co-pending application is entitled to the benefit of the filing date, and which is a continuation of U.S. patent application Ser. No. 14/455,534, entitled SYSTEM AND METHODS FOR PROVIDING AT LEAST A PORTION OF A TRAVEL PLAN THAT CALLS FOR AT LEAST ONE TRANSPORTATION VEHICLE UNIT, naming Richard T. Lord, Robert W. Lord, Nathan P. Myhrvold, and Clarence T. Tegreene, as inventors, filed Aug. 8, 2014.

The present application constitutes a continuation-in-part of U.S. patent application Ser. No. 14/476,042, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed Sep. 3, 2014, which is currently co-pending or is an application of which a currently co-pending application is entitled to the benefit of the filing date, and which is a continuation of U.S. patent application Ser. No. 14/474,587, entitled SYSTEM AND METHODS FOR IDENTIFYING ONE OR MORE TRANSPORTATION VEHICLE UNITS WITH OR WITHOUT PACKAGE DELIVERY OBLIGATION FOR TRANSPORTING ONE OR MORE END USERS, naming Richard T. Lord, Robert W. Lord, Nathan P. Myhrvold, and Clarence T. Tegreene, as inventors, filed Sep. 2, 2014.

The present application constitutes a continuation-in-part of U.S. patent application Ser. No. 14/511,706, entitled SYSTEM AND METHODS FOR DIRECTING ONE OR MORE TRANSPORTATION VEHICLE UNITS TO TRANSPORT ONE OR MORE END USERS, naming Richard T. Lord, Robert W. Lord, Nathan P. Myhrvold, and Clarence T. Tegreene, as inventors, filed Oct. 10, 2014, which is currently co-pending or is an application of which a currently co-pending application is entitled to the benefit of the filing date, and which is a continuation of U.S. patent application Ser. No. 14/510,383, entitled SYSTEM AND METHODS FOR DIRECTING ONE OR MORE TRANSPORTATION VEHICLE UNITS TO TRANSPORT ONE OR MORE END USERS, naming Richard T. Lord, Robert W. Lord, Nathan P. Myhrvold, and Clarence T. Tegreene, as inventors, filed Oct. 9, 2014.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, receiving one or more package delivery directives that direct a transportation vehicle unit to deliver one or more packages, receiving one or more end user transport directives that direct the transportation vehicle unit to transport one or more end users; and verifying that the one or more end user transport directives do not conflict with the one or more package delivery directives such that transport of the one or more end users by the transportation vehicle unit in accordance with the one or more end user transport directives will not violate one or more package delivery obligations of the transportation vehicle unit to deliver the one or more packages in accordance with the one or more package delivery directives. In various implementations, at least one of the above operations is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving one or more package delivery directives that direct a transportation vehicle unit to deliver one or more packages, means for receiving one or more end user transport directives that direct the transportation vehicle unit to transport one or more end users; and means for verifying that the one or more end user transport directives do not conflict with the one or more package delivery directives such that transport of the one or more end users by the transportation vehicle unit in accordance with the one or more end user transport directives will not violate one or more package delivery obligations of the transportation vehicle unit to deliver the one or more packages in accordance with the one or more package delivery directives. In addition to the foregoing, other system aspects are described in the claims, drawings, and text forming a part of the disclosure set forth herein.

In one or more various aspects, a system includes, but is not limited to, circuitry for receiving one or more package delivery directives that direct a transportation vehicle unit to deliver one or more packages, circuitry for receiving one or more end user transport directives that direct the transportation vehicle unit to transport one or more end users; and circuitry for verifying that the one or more end user transport directives do not conflict with the one or more package delivery directives such that transport of the one or more end users by the transportation vehicle unit in accordance with the one or more end user transport directives will not violate one or more package delivery obligations of the transportation vehicle unit to deliver the one or more packages in accordance with the one or more package delivery directives. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving one or more package delivery directives that direct a transportation vehicle unit to deliver one or more packages, receiving one or more end user transport directives that direct the transportation vehicle unit to transport one or more end users, and verifying that the one or more end user transport directives do not conflict with the one or more package delivery directives such that transport of the one or more end users by the transportation vehicle unit in accordance with the one or more end user transport directives will not violate one or more package delivery obligations of the transportation vehicle unit to deliver the one or more packages in accordance with the one or more package delivery directives. In addition to the foregoing, other computer program product aspects are described in the claims, drawings, and text forming a part of the disclosure set forth herein.

In one or more various aspects, a system includes, but is not limited to a transport directive receiving module configured to receive one or more end user transport directives that direct a transportation vehicle unit to transport one or more end users; a non-conflict confirming module configured to confirm that the one or more end user transport directives do not conflict with one or more package delivery directives such that transport of the one or more end users by the transportation vehicle unit in accordance with the one or more end user transport directives will not violate one or more package delivery obligations of the transportation vehicle unit to deliver one or more packages in accordance with the one or more package delivery directives; and one or more processors.

In one or more various aspects, a system includes, but is not limited to, circuitry for receiving one or more end user transport directives that direct a transportation vehicle unit to transport one or more end users; and circuitry for confirming that the one or more end user transport directives do not conflict with one or more package delivery directives such that transport of the one or more end users by the transportation vehicle unit in accordance with the one or more end user transport directives will not violate one or more package delivery obligations of the transportation vehicle unit to deliver one or more packages in accordance with the one or more package delivery directives.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3A shows another perspective of the package delivery directive receiving module 202* of FIGS. 2A and 2B (e.g., the package delivery directive receiving module 202' of FIG. 2A or the package delivery directive receiving module 202" of FIG. 2B) in accordance with various embodiments.

FIG. 3B shows another perspective of the transport directive receiving module 204* of FIGS. 2A and 2B (e.g., the transport directive receiving module 204' of FIG. 2A or the transport directive receiving module 204" of FIG. 2B) in accordance with various embodiments.

FIG. 3E illustrates types of information that may be included in directives/obligations that may be received and/or accepted by the transport computing device 10* of FIG. 1 (e.g., the transport computing device 10' of FIG. 2A or the transport computing device 10" of FIG. 2B)

FIG. 8C is a high-level logic flowchart of a process depicting alternate implementations of the non-conflict verifying operation 506 of FIG. 5.

DETAILED DESCRIPTION

Figure 1:
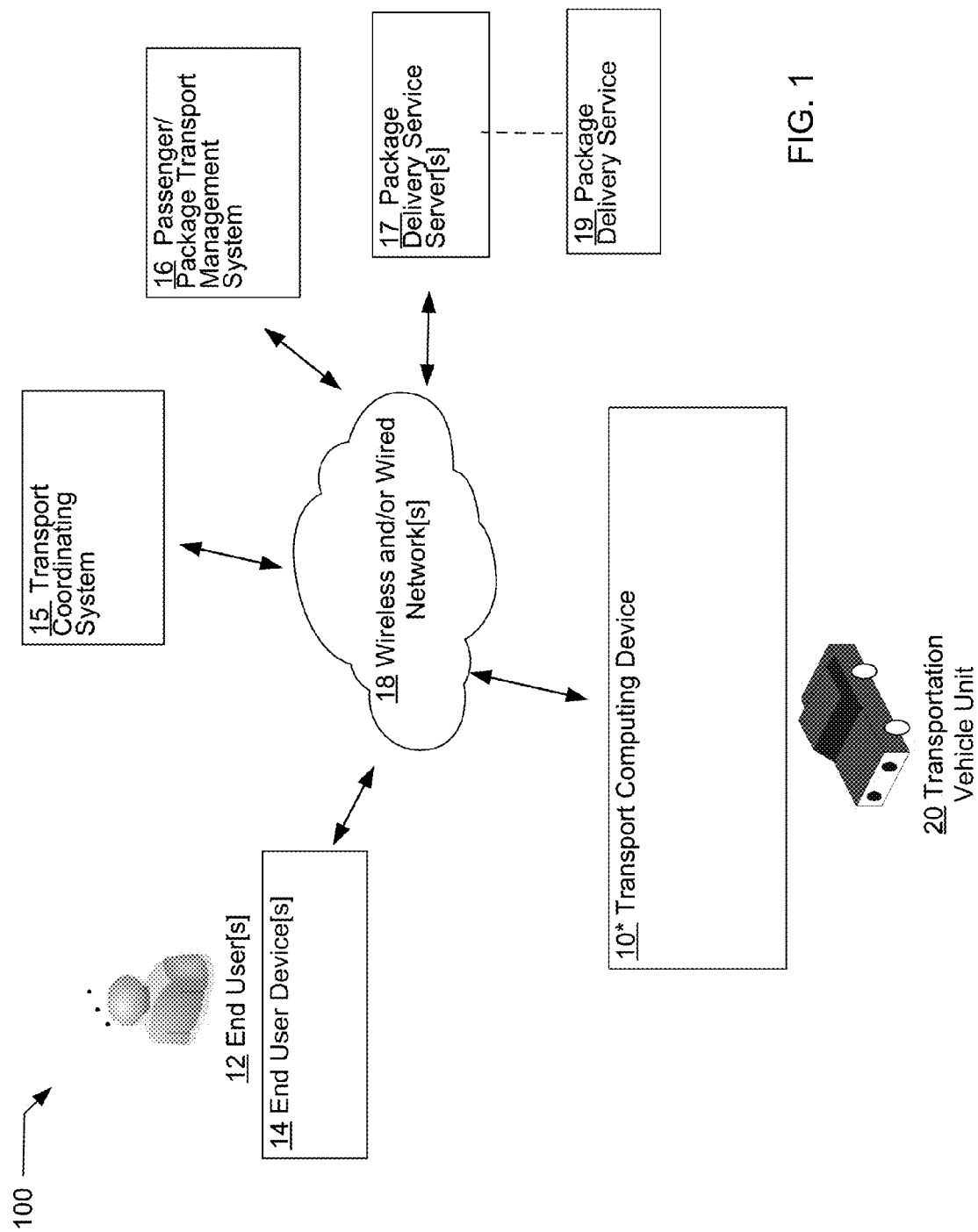
FIG. 1 illustrates a transport computing device 10* operating in an exemplary environment

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., WIKIPEDIA, High-level programming language, (as of Jun. 5, 2012, 21:00 GMT). In order to facilitate human comprehension, in many instances, high-level programming languages resemble or even share symbols with natural languages. See, e.g., WIKIPEDIA, (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., WIKIPEDIA, Logic gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., WIKIPEDIA, Computer architecture, (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., WIKIPEDIA, Instructions per second, (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mutt," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and RACK-SPACE). PaaS may include, e.g., one or more software and/or development tools hosted on an infrastructure (e.g., a computing platform and/or a solution stack from which the client can create software interfaces and applications, e.g., MICROSOFT AZURE). SaaS may include, e.g., software hosted by a service provider and accessible over a network (e.g., the software for the application and/or the data associated with that software application may be kept on the network, e.g., GOOGLE APPS, SALES FORCE). DaaS may include, e.g., providing desktop, applications, data, and/or services for the user over a network (e.g., providing a multi-application framework, the applications in the framework, the data associated with the applications, and/or services related to the applications and/or the data over the network, e.g., CITRIX). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation/commuting particularly in urban settings is the development of transportation networking services provided by web-based companies such as UBER and LYFT that allow users to retain drivers/vehicles for transportation serves through, for example, mobile applications. The increasingly popularity of such "ridesharing" services have made some of the early entrants in this new field household names. As with many new technological ventures, the functionalities provided through such services are somewhat limited. However there appears to be ample opportunities for adding new and value adding functionalities to such services (as well as to more traditional transportation services such as Taxi services) in order to provide more robust transportation networking systems.

Paralleling the rapidly increasing demand for ridesharing services is the explosive demand for door-to-door package delivery services that are partly as a result of increasingly popularity of online retail services such as Amazon, eBay, and so forth. The demand for door-to-door package delivery services, however, can fluctuate wildly during the course of a typical year. For example, although demand for such services may be generally steady throughout the year, demand for such services will often explode during certain times of the year such as during the holiday season (e.g., Thanksgiving to New Year), Mother's day, and so forth. Although a few of the online retailers, such as Amazon, are currently attempting to provide their own door-to-door package delivery services, most of door-to-door package delivery services are provided by a small group of relatively large parcel delivery companies (e.g., UPS, FedEx, DSL, USPS, and so forth). Unfortunately, these parcel delivery companies have limited resources (e.g., delivery vehicles) and are sometimes unable to meet demand for door-to-door package delivery services particularly during peak seasons (e.g., holiday season).

Accordingly, network systems are proposed that will allow for-hire passenger vehicles (herein "transportation vehicle units"), such as those provided by ridesharing or taxi services, to seamlessly transport passengers as well as to deliver packages—sometimes transporting passengers and delivering packages concurrently. In some cases, these network systems may be able to coordinate the matching of a transportation vehicle unit with one or more end users (e.g., passengers or customers) even when, for example, the transportation vehicle unit already has obligations to deliver packages. However, one drawback that these network systems may have is that in some situations they may not always have the most up-to-date information related to the package delivery obligations (as well passenger transport obligations) of transportation vehicle units. Thus, in order to ensure that a particular transportation vehicle unit will be able to transport one or more end users without violating package delivery obligations of the transportation vehicle unit, systems and methods are provided herein that may be designed to, among other things, verify or confirm that one or more end user transport directives that direct the transportation vehicle unit to transport one or more end users do not conflict with one or more package delivery directives that direct the transportation vehicle unit to deliver one or more packages.

In various embodiments, the verification or confirmation process may be performed by comparing the requirements for delivering one or more packages as called for by the one or more package delivery directives to the requirements for transporting the one or more end users as called for by the one or more end user transport directives. In some embodiments, the systems and methods may be implemented locally by a transport computing device that may be associated with a transportation vehicle unit (which includes at least a transport vehicle such as a gas or electric powered vehicle and a human or robotic driver). In some cases, the transport computing device may be a mobile computing device such as a Smartphone or tablet computer that executes specialized software, or maybe a dedicated computing device with, for example, specialized hardware, software, and/or firmware and specifically designed to perform the various functions and operations to be described herein.

Referring now to FIG. 1, which illustrates a transport computing device 10* operating in an exemplary environment 100. In various embodiments, the various operations and functionalities to be described herein may be implemented by the transport computing device 10*, which in some cases, may be associated with a transportation vehicle unit 20. The transport computing device 10* may be designed to, among other things, receive one or more package delivery directives that direct (e.g., instruct) a transportation vehicle unit 20 to deliver one or more packages; receive one or more end user transport directives that direct the transportation vehicle unit 20 to transport one or more end users 12; and verify or confirm that the one or more end user transport directives do not conflict with the one or more package delivery directives such that transport of the one or more end users 12 by the transportation vehicle unit 20 in accordance with the one or more end user transport directives will not violate or conflict with one or more package delivery obligations of the transportation vehicle unit 20 to deliver the one or more packages in accordance with the one or more package delivery directives. As previously indicated, the transport computing device 10* may be a mobile computing device such as a Smartphone or tablet computer that executes specialized software, or a dedicated computing system with specialized hardware, software, and/or firmware.

Note that for purposes of the following description "*" represents a wildcard. Thus, references in the following description to, for example, "transport computing device 10*" may be in reference to the transport computing device 10' of FIG. 2A, as well as to the transport computing device 10" of FIG. 2B, which are two different implementations of the transport computing device 10* of FIG. 1.

Referring back to FIG. 1, in various embodiments, the transport computing vehicle unit 20 may be in communication with a variety of entities via one or more wireless and/or wired networks 18 including, for example, one or more end users 12 (via one or more end user devices 14 such as Smartphones), a transport coordinating system 15, a passenger/package transport management system 16, and/or a package delivery service server(s) 17. The one or more end users 12 are prospective passengers for being transported by one or more transportation vehicle units 20. The package delivery service server(s) 17 may be one or more network servers for a package delivery service 19 (e.g., FedEx, UPS, Amazon, etc.) that arranges for packages (e.g., parcels) to be delivered to destination locations. The passenger/package transport management system 16 may be one or more network servers that coordinates and matches packages as well as end users 12 to transportation vehicle units 20 for delivery and transport to their destinations. The one or more wireless and/or wired networks 18 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth. Note that for ease of illustration and explanation, FIG. 1 does not illustrate multiple transportation vehicle units 20 being in communication with the passenger/package transport management system 16. However, for purposes of the following description, the passenger/package transport management system 16 may, in fact, be in communication with multiple transportation vehicle units 20 (via multiple transport computing devices 10*).

In some cases, the passenger/package transport management system 16, which may be located overseas, may communicate with transportation vehicle units 20 (via transport computing devices 10*) through a transport coordinating system 15, which may be a locally based network server(s). In order to try to match packages and end users 12 to the proper transportation vehicle units 20, the passenger/package transport management system 16 may be provided with the current package delivery obligations, as well as current end user transport obligations of each transportation vehicle unit 20. That is, each transportation vehicle unit 20 (via their own associated transport computing device 10*) may periodically or continuously provide its current outstanding obligations (including no obligation) for package deliveries (as well as its current passenger transport obligations) to the passenger/package transport management system 16 (sometimes via the transport coordinating system 15). By comparing the current package delivery obligations (or the lack thereof) of each of the transportation vehicle units 20 with the requirements for transporting prospective passengers (e.g., end users 12), the passenger/package transport management system 16 may match the prospective passengers to the appropriate transportation vehicle unit 20.

Note, however, that in many situations the matching operations (e.g., matching prospective passengers to a transportation vehicle unit 20 that may or may not have package delivery obligations) performed by the passenger/package transport management system 16 may be faulty because the passenger/package transport management system 16 may not have the most current information related to the current package delivery obligations of transportation vehicle units 20. This may be as a result of many factors including, for example, the reporting of current package delivery obligations by transportation vehicle units 20 may only be periodic, due to communication disruptions between transportation vehicle units 20 and the passenger/package transport management system 16, or failure of human drivers to record/report fulfillments or failure to fulfill package delivery obligations.

In order to facilitate understanding of the various concepts related to the processes and operations to be described herein, the following illustrative scenario is provided that shows how one or more transportation vehicle units 20 may become obligated to deliver packages (e.g., package delivery obligations) and how an end user 12 (e.g., a prospective passenger) may be assigned to be transported by a specific transportation vehicle unit 20 (which may or may not have currently outstanding package delivery obligations). When a package delivery service (e.g., FedEx, UPS, Amazon, etc.) is in need of transportation vehicle unit(s) 20 for delivery of multiple packages going to multiple package delivery locations, it may transmit using the package delivery service server(s) 17 one or more deliveries to the passenger/package transport management system 16 (alternatively, such a delivery request(s) may be transmitted directly to one or more transportation vehicle units 20 from the package delivery service server 17 if the package delivery service 19 is permitted to have direct relationship with the one or more transportation vehicle units 20).

The passenger/package transport management system 16 upon receiving the delivery request(s) may then determine which transportation vehicle unit or unit(s) 20 should be assigned to deliver the packages based on their current availability (e.g., based on whether they are in-service or off-duty), current outstanding package delivery obligations, current outstanding passenger transport obligations, and so forth. That is, each of the transportation vehicle units 20 that are in contact with the passenger/package transport management system 16 may periodically or continuously be providing to the passenger/package transport management system 16 their current obligations (e.g., outstanding package delivery obligations and/or passenger transport obligations) and statuses (e.g., whether they are on-duty or on lunch break). Based on the known obligations and statuses of the transportation vehicle units 20, the passenger/package transport management system 16 may determine which of the transportation vehicle units 20 should be assigned to deliver the packages. For example, if a particular transportation vehicle unit 20 already has obligations to deliver packages and/or passengers to their destination location(s) that would prevent the particular transportation vehicle unit 20 from securing the package or packages that are being requested to be delivered by the package delivery service 19, then that particular transportation unit 20 will not be assigned to deliver the package or packages.

In any event, after determining/selecting which of the transportation vehicle units 20 should deliver the packages, the passenger/package transport management system 16 may contact the determined transportation vehicle unit(s) 20 by transmitting to the transport computing device(s) 10* associated with the determined transportation vehicle unit(s) 20 one or more package delivery directives that direct (e.g., instructs) the determined transportation vehicle unit(s) 20 to deliver the packages. In some cases, the passenger/package transport management system 16 may transmit the one or more package delivery directives to the determined transportation vehicle unit(s) 20 (via the associated transport computing device(s) 10*) indirectly through the transport coordinating system 15. Similarly when the package delivery service server 17 transmits delivery requests, the delivery requests may be transmitted to the transport coordinating system 15 (rather than transmitted directly to the passenger/package transport management system 16), which may then relay the delivery requests to the passenger/package transport management system 16.

The package delivery directives that may be transmitted to the transport computing device(s) 10* associated with the determined transportation vehicle unit(s) 20 may indicate a variety of information including pickup location or locations for securing the packages to be delivered, package delivery locations (e.g., delivery drop-off locations), delivery deadlines, package delivery preferences (e.g., transported in air-conditioned environment), and so forth. Note that in some cases, a package delivery directive may, in fact, become a package delivery obligation upon a transport computing device 10* receiving the package delivery directive. In other cases, however, a package delivery directive may only become a package delivery obligation upon acceptance of the package delivery directive by the transport computing device 10* or by a human or robotic driver of the associated transportation vehicle unit 20. In these cases, the transport computing device 10* upon acceptance of the package delivery directive may transmit to the passenger/package transport management system 16 (in some cases via the transport coordinating system 15) a confirmation that the package delivery directive has been accepted.

During the course of a typical day, a transportation vehicle unit 20 (via the associated transport computing device 10*) may continuously, periodically, or randomly provide to the passenger/package transport management system 16 information that indicates statuses of its package delivery obligations and passenger transport obligations. For example, as each of its package delivery obligations are one by one fulfilled (e.g., fulfilled by delivering the associated packages to their package delivery locations), the transportation vehicle unit 20 (via the associated transport computing device 10*) may transmit to the passenger/package transport management system 16 obligation status information that indicate statuses of various package delivery obligations of the transportation vehicle unit 20 including whether there are any currently outstanding package delivery obligations and/or whether there are any new package delivery obligations (e.g., the transportation vehicle unit 20 may have been contacted directly by the package delivery service 19 to deliver one or more packages). Such information may help the passenger/package transport management system 16 to determine the current status/availability of the transportation vehicle unit 20.

When an end user 12 is interested in being transported to a destination location, the end user 12 (e.g., a prospective passenger) may transmit, using an end user device 14 (e.g., a desktop computer, or a mobile computing device such as a Smartphone or a tablet computer), a transport request to the passenger/package transport management system 16 via, in some cases, the transport coordinating system 15. The passenger/package transport management system 16, in response to receiving the transport request, may then make a determination as to which of multiple transportation vehicle units 20 that it is in communication with should be assigned to transport the end user 12.

This determination may be based on a number of factors including, for example, proximity of a transportation vehicle unit 20 to a rendezvous location for rendezvousing/meeting the end user 12 (which, in some cases, may be the current location of the end user 12). Another factor that may be considered includes, for example, whether the transportation vehicle unit 20 has any outstanding package delivery obligations and if it does have outstanding package delivery obligations, whether the outstanding package delivery obligations can be satisfactorily fulfilled even if the transportation vehicle unit 20 transports the end user 12. Yet another factor that may be considered includes the end user preference of the end user 12 including preference related to package deliveries during transport of the end user 12 (e.g., an end user 12 may prefer that no package delivery may be made during transport of the end user 12 or may permit up to two package deliveries to be made during transport of the end user 12 so long as such deliveries do not add more than 15 minutes of time delay and so long as the transport fee is discounted for the inconvenience), and so forth.

Note that in cases where the end user 12 permits package deliveries during transport of the end user 12 and the transportation vehicle unit 20 to be assigned to transport the end user 12 currently has outstanding package delivery obligations, the passenger/package transport management system 16 may be further designed to determine which of the package delivery obligations can be fulfilled during transport of the end user 12 (e.g., to determine which of the packages being carried by the transportation vehicle unit 20 can be delivered during transport of the end user 12). In some cases, such a determination may be based on the delivery locations for the packages being carried by the transportation vehicle unit 20 relative to the direct route (e.g., shortest or most time efficient route) for transporting the end user 12 to the end user destination location. Other factors may also be considered for such a determination including, for example, the priority (e.g., priority vs express package delivery) of packages to be delivered.

After determining or selecting a transportation vehicle unit 20 for transporting the end user 12, the passenger/package transport management system 16 may transmit (via the transport coordinating system 15 in some cases) to the transport computing device 10* associated with the selected transportation vehicle unit 20 one or more end user transport directives that direct (e.g., instructs) the selected transportation vehicle unit 20 to transport the end user 12. The one or more end user transport directives that are received by the transport computing device 10* may include a variety of information including end user information (e.g., identity and/or image of the end user 12), a rendezvous location for rendezvousing with the end user 12, a destination location, end user preferences (including transport preferences and package delivery preferences), and so forth. In some cases, the one or more end user transport directives may also indicate packages that may be permitted to be delivered during transport of the end user 12. For example, in some cases, the one or more end user transport directives may indicate a list of one or more packages that may be delivered during transport of the end user 12, a discount transport fee rate that may be charged to the end user 12 for being permitted to deliver packages during transport of the end user 12, and so forth.

Upon reception of the one or more end user transport directives, the transport computing device 10* associated with the selected transportation vehicle unit 20 may verify or confirm that the one or more end user transport directives do not conflict with one or more package delivery directives that it may have previously received and accepted (and that are still outstanding in the form of outstanding package delivery obligations). The verification or confirmation may be needed because the passenger/package transport management system 16 will often not have the most up-to-date status and obligation information related to the selected transportation vehicle unit 20. Instead, the most up-to-date status and obligation information of the selected transportation vehicle unit 20 may be available to the transport computing device 10\* associated with the selected transportation vehicle unit 20.

The verification (e.g., confirmation) process may involve looking at a number of factors in order to confirm that the one or more end user transport directives do not conflict with one or more package delivery directives that were previously received and accepted by the transport computing device 10\*. For example, in some cases, the transport computing device 10\* (or its logic) may initially determine whether there are any outstanding package delivery obligations that the associated transportation vehicle unit 20 has yet to fulfill. If it is determined that the associated transportation vehicle unit 20 does, in fact, have one or more outstanding package delivery obligations, then a determination may be made as to whether the one or more outstanding package delivery obligations can be satisfactorily fulfilled if the associated transportation vehicle unit 20 transports the end user 12.

The transport computing device 10\* may also determine whether any of the one or more outstanding package delivery obligations can be fulfilled during the transport of the end user 12 if the end user 12 permits the delivery of one or more packages during transport of the end user 12. Such a determination may be based on a number of factors including, for example, the proximity of the delivery locations of the packages relative to the direct route for transporting the end user 12 to the end user destination location and the amount of delay time that will be incurred. A more detailed discussion related to the verification or confirmation process will be provided below with respect to the various processes and operations to be described herein.

As briefly described above, when a transportation vehicle unit 20 that has been assigned to transport an end user 12 is determined to have one or more outstanding package delivery obligations for delivering one or more packages, a determination may be made by the associated transport computing device 10\* (or its logic) as to which of the outstanding package delivery obligations can be fulfilled (e.g., which of the packages being carried by the transportation vehicle unit 20 can be delivered) during the transport of the end user 12. Such a determination may be based, for example, on the proximity of the delivery locations of the one or more packages being carried by the transportation vehicle unit 20 relative to the route (e.g., a direct route that is the shortest distance or most time efficient route) that the transportation vehicle unit 20 may use in order to transport the end user 12 to the end user destination location and/or based on end user preferences (e.g., only one package delivery allowed during transport of the end user 12 or no package delivery allowed that adds more than 10 minutes to total travel time).

Figure 4A:
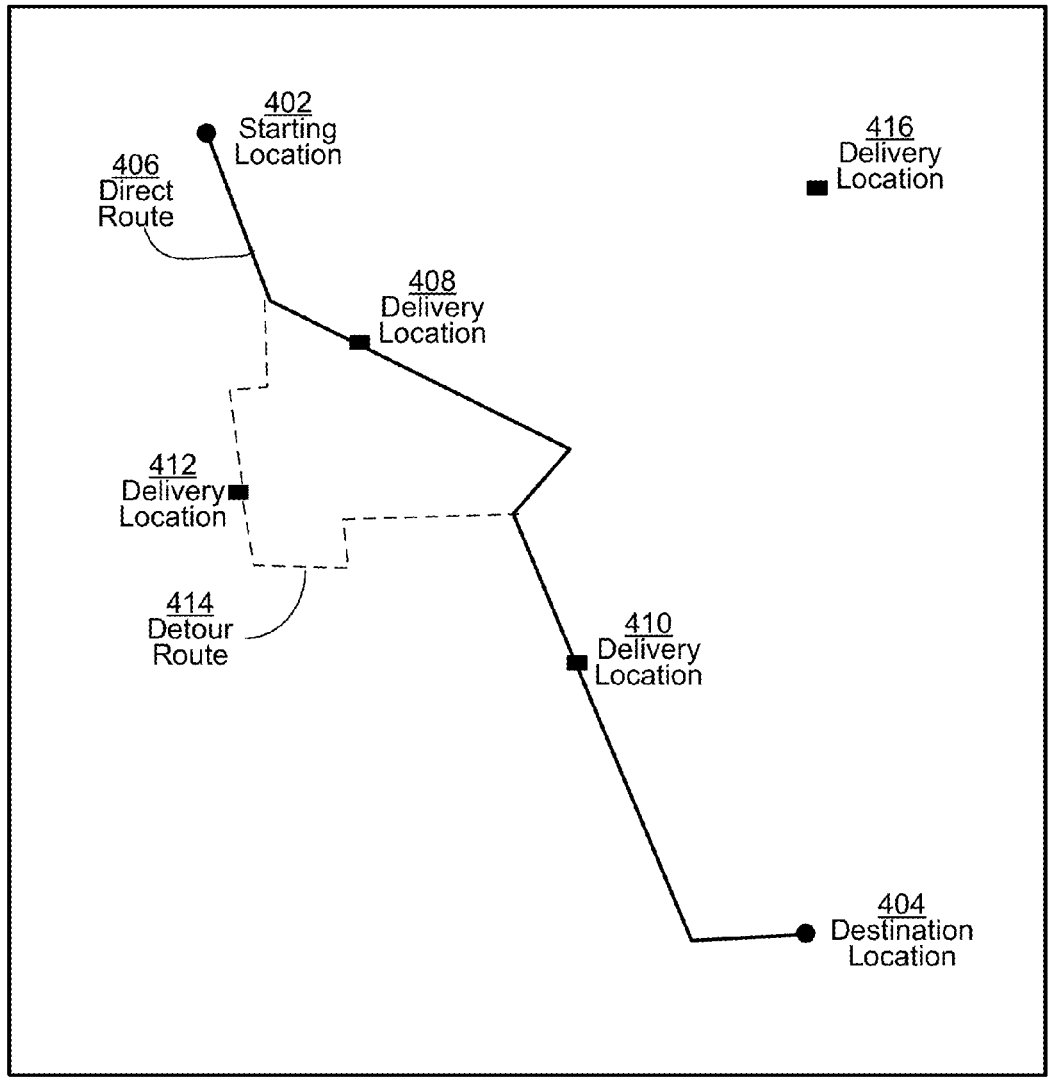
FIG. 4A illustrates exemplary alternative routes to a destination location and delivery locations for packages.

For example, referring now to FIG. 4A, which illustrates an exemplary direct route 406 from a starting location 402 (e.g., a rendezvous location where an end user 12 may rendezvous with a transportation vehicle unit 20 for transport) to a destination location 404 that the transportation vehicle unit 20 may use in order to transport the end user 12 to the destination location 404 (note that in the following, the phrase "end user destination location" and the phrase "destination location" are interchangeably used and are, therefore, synonymous). FIG. 4A further illustrates example delivery locations 408, 410, 412, and 416 of packages (e.g., parcels) that the transportation vehicle unit 20 may be obligated to deliver (note that in the following, the phrase "package delivery location" and the phrase "delivery location," are interchangeably used and are, therefore, synonymous). Note that there are typically many different ways (e.g., routes) for traveling from a starting location 402 to a destination location 404 in a typical urban or semi-urban setting. In some cases a "direct" route 406 may be the shortest distance route that the transportation vehicle unit 20 may use in order to travel from the starting location to the destination location. In alternative cases, however, the direct route 406 may be the most time efficient route (e.g., fastest or quickest route) that the transportation vehicle unit 20 may use in order to travel from the starting location 402 to the destination location 404.

As illustrated, the delivery locations 408, 410, 412, and 416 of the packages that are obligated to be delivered by the transportation vehicle unit 20 are located in several different locations relative to the direct route 406. Delivery locations 408 and 410, as illustrated, are actually located directly on or proximate to the direct route 406, while delivery location 412 is located in the relative proximity of the direct route 406 and could be reached by the transportation vehicle unit 20 during the transport of the end user 12 if the transportation vehicle unit 20 takes a short detour route 414 from the direct route 406. Delivery location 416 in contrast to the delivery locations 408, 410, and 412 is relatively far away from the direct route 406. Thus, any package scheduled to be delivered to the delivery location 416 may, in some cases, not be allowed to be delivered during the transport of the end user 12 to the destination location 404. Note that if the transportation vehicle unit 20 is obligated to deliver a package to the delivery location 416 by a particular predefined time deadline (e.g., a deadline that will occur during transport of the end user 12) then that may preclude the transportation vehicle unit 20 from transporting the end user 12 to the destination location 404. In such circumstances, another vehicle may be assigned to transport the end user 12.

With respect to the packages that are to be delivered to the delivery locations 408, 410, and 412, the transportation vehicle unit 20 may or may not deliver such packages during the transport of the end user 12 depending on, for example, preferences (herein "end user preference") of the one or more end users 12 (or of a third party such as the ridesharing or taxi company associated with the transportation vehicle unit 20). For example, if there is an end user preference that no packages are to be delivered during the transport of the end user 12 then no packages will be delivered during transport of the end user 12. On the other hand, if there is an end user preference that allows package delivery only for delivery locations along the direct route then only packages to be delivered along the direct route (e.g., packages going to delivery locations 408 and 410) will be allowed to be delivered during transport of the end user 12. If the end user preference further only allows one package delivery during transport of the one or more end user 12 then only packages going to one of the two delivery locations (e.g., delivery locations 408 and 410) will actually be allowed.

In some cases, if the end user preferences of the end user 12 allows for "limited" deliveries of packages (e.g., package deliveries that do not require substantial detour from the direct route 406 or that do not add a significant amount of travel time to the destination location 404) during the transport of the end user 12, then packages may be delivered to, for example, the delivery location 412 during transport of the one or more end user 12. It is recognized that in most instances, passengers (e.g., end user 12) may not want to have their transportation vehicle unit 20 make package deliveries during their transport to their destination location. Thus, in order to provide an incentive, in some cases, passenger transportation fees charged to end user 12 may be discounted when packages are delivered during the transport of the end user 12. The passenger fee discount that may be given may be on a sliding scale basis where a greater discount may be given when more package delivery stops are made during the transport of an end user 12 or when more travel time is added to overall travel time for transporting the end user 12 to the end user destination location (e.g., the greater the delay in transporting the end user 12 to the end user destination location, the greater the discount).

Figure 2A:
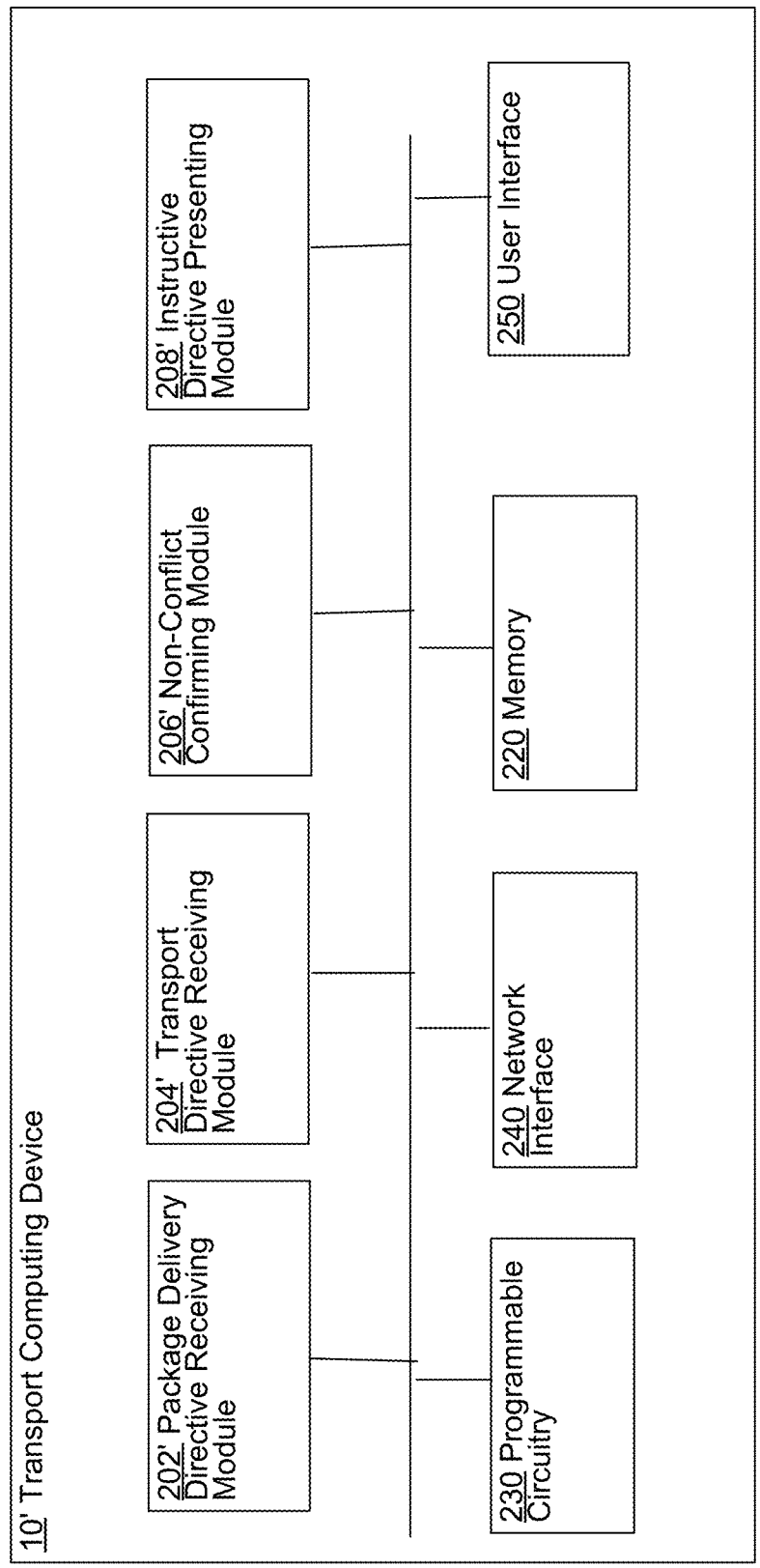
FIG. 2A shows a high-level block diagram of a particular implementation of the transport computing device 10* of FIG. 1 (illustrated as transport computing device 10').
Figure 2B:
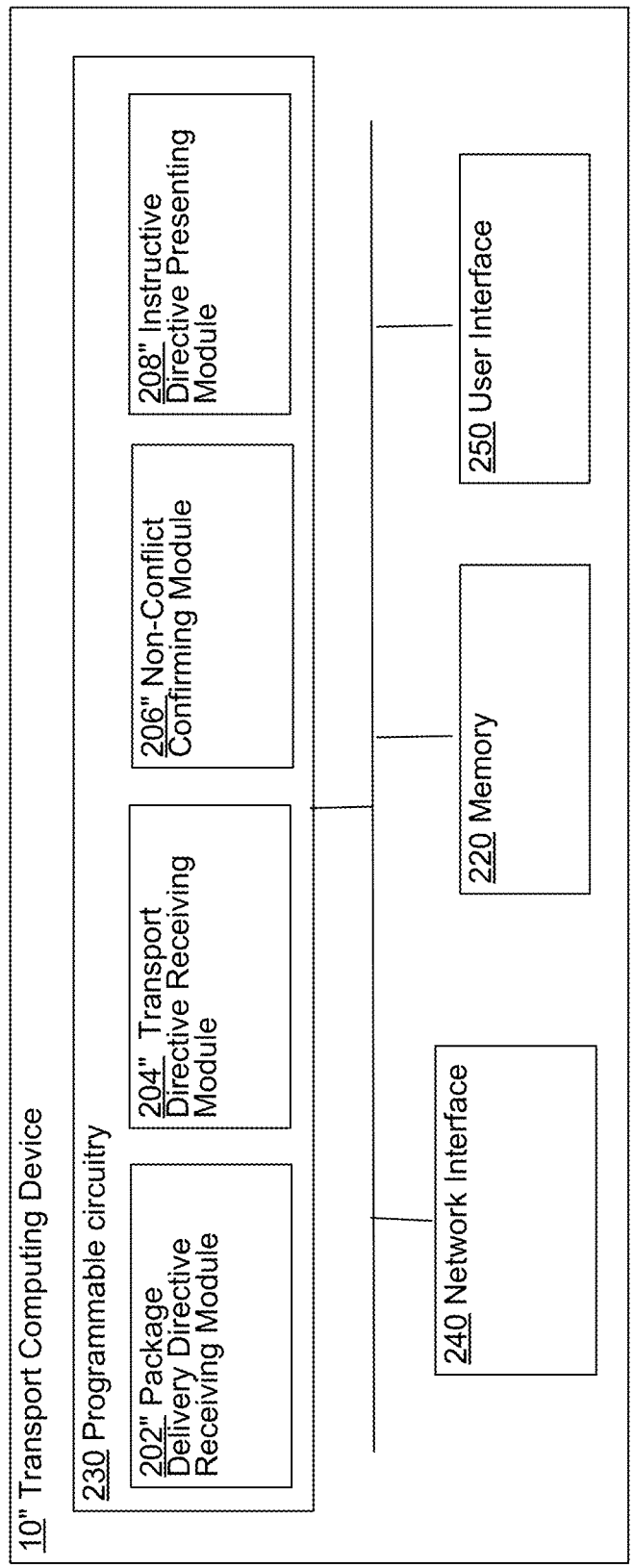
FIG. 2B shows another high-level block diagram of another implementation of the transport computing device 10* of FIG. 1 (illustrated as transport computing device 10").

Referring now to FIGS. 2A and 2B, which illustrate two block diagrams representing two different implementations of the transport computing device 10* of FIG. 1. In particular, and as will be further described herein, FIG. 2A illustrates a transport computing device 10' that is the "hardwired" or "hard" implementation of the transport computing device 10* of FIG. 1 that can implement the operations and processes to be described herein. The transport computing device 10' includes certain logic modules including a package delivery directive receiving module 202', a transport directive receiving module 204', a non-conflict confirming module 206', and an instructive directive presenting module 208' that are implemented using purely hardware or circuitry components (e.g., application specific integrated circuit (or ASIC). In contrast, FIG. 2B illustrates a transport computing device 10" that is the "soft" implementation of the transport computing device 10* of FIG. 1 in which certain logic modules including a package delivery directive receiving module 202", a transport directive receiving module 204", a non-conflict confirming module 206", and an instructive directive presenting module 208" are implemented using programmable circuitry 230 (e.g., one or more processors 230 including one or more microprocessors, controllers, CPUs, GPUs, etc.) executing one or more programming instructions (e.g., software). Note that in some embodiments, the transport computing device 10" illustrated in FIG. 2B may be a general purposes computing device (e.g., a desktop computer or a mobile computing device such as a Smartphone or tablet computer) that executes specialized computer readable instructions (e.g., software).

The embodiments of the transport computing device 10* illustrated in FIGS. 2A and 2B (e.g., the transport computing device 10' of FIG. 2A and the transport computing device 10" of FIG. 2B) are two extreme implementations of the transport computing device 10* in which all of the logic modules (e.g., the package delivery directive receiving module 202', the transport directive receiving module 204', the non-conflict confirming module 206', and the instructive directive presenting module 208') are implemented using purely hardware solutions (e.g., circuitry such as ASIC) as illustrated in FIG. 2A or in which all of the logic modules (e.g., the package delivery directive receiving module 202", the transport directive receiving module 204", the non-conflict confirming module 206", and the instructive directive presenting module 208") are implemented using software solutions (e.g., programmable instructions being executed by programmable circuitry 230 such as field programmable gate array (FPGA) or one or more processors) as illustrated in FIG. 2B. Since there are many ways of combining hardware, software, and/or firmware in order to implement the various logic modules (e.g., the package delivery directive receiving module 202*, the transport directive receiving module 204*, the non-conflict confirming module 206*, and the instructive directive presenting module 208"), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry such as one or more processors 230 (or FPGA) are still needed in order to execute the software (or firmware). Further details related to the two implementations of transport computing device 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the transport computing device 10', in addition to the package delivery directive receiving module 202', the transport directive receiving module 204', the non-conflict confirming module 206,' and the instructive directive presenting module 208', may further include programmable circuitry 230 (e.g., microprocessors, controllers, and so forth), a network interface 240 (network interface card or NIC), memory 220, and/or a user interface 250. In various embodiments, memory 220 may comprise of volatile and/or non-volatile memory. In some embodiments, memory 220 may comprise of one or more of mass storage device, cache memory, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including data indicating current package delivery obligations of a transportation vehicle units 20, end user preferences, and so forth.

Turning now to FIG. 2B, which illustrates a transport computing device 10" in which certain logic modules (the package delivery directive receiving module 202", the transport directive receiving module 204", the non-conflict confirming module 206", and the instructive directive presenting module 208") are implemented using programmable circuitry 230. In addition, the transport computing device 10" may further include a memory 220, a network interface 240, and/or a user interface 250 similar to the transport computing device 10' of FIG. 2A.

In various embodiments the package delivery directive receiving module 202* of FIG. 2A or 2B (e.g., the package delivery directive receiving module 202' of FIG. 2A or the package delivery directive receiving module 202" of FIG. 2B) may be configured to, among other things, receive one or more package delivery directives that direct a transportation vehicle unit 20 to deliver one or more packages. In contrast, the transport directive receiving module 204* of FIG. 2A or 2B (e.g., the transport directive receiving module 204' of FIG. 2A or the transport directive receiving module 204" of FIG. 2B) may be configured to, among other things, receive one or more end user transport directives that direct the transportation vehicle unit 20 to transport one or more end users 12. Meanwhile, the non-conflict confirming module 206\* of FIG. 2A or 2B (e.g., the non-conflict confirming module 206' of FIG. 2A or the non-conflict confirming module 206" of FIG. 2B) may be configured to, among other things, verify or confirm that the one or more end user transport directives do not conflict with the one or more package delivery directives such that transport of the one or more end users 12 by the transportation vehicle unit 20 in accordance with the one or more end user transport directives will not violate one or more package delivery obligations of the transportation vehicle unit 20 to deliver the one or more packages in accordance with the one or more package delivery directives. On the other hand, the instructive directive presenting module 208\* of FIG. 2A or 2B (e.g., the instructive directive presenting module 208' of FIG. 2A or the instructive directive presenting module 208" of FIG. 2B) may be configured to, among other things, present, in response to verification that the one or more end user transport directives do not conflict with the one or more package delivery obligations directives, one or more instructive directives that direct the transportation vehicle unit 20 to transport the one or more end users 12.

Referring now to FIG. 3A illustrating a particular implementation of the package delivery directive receiving module 202\* (e.g., the package delivery directive receiving module 202' or the package delivery directive receiving module 202") of FIG. 2A or 2B. As illustrated, the package delivery directive receiving module 202\* may include one or more sub-logic modules in various alternative implementations. For example, in various embodiments, the package delivery directive receiving module 202\* may further include a package delivery directive network receiving module 302, a package delivery directive user interface receiving module 304, a confirmation transmitting module 306, and/or a directive registering module 308. Specific details related to the package delivery directive receiving module 202\* as well as the above-described sub-modules of the package delivery directive receiving module 202\* will be provided below with respect to the operations and processes to be described herein.

FIG. 3B illustrates a particular implementation of the transport directive receiving module 204\* (e.g., the transport directive receiving module 204' or the transport directive receiving module 204") of FIG. 2A or 2B. As illustrated, the transport directive receiving module 204\* may include one or more sub-logic modules in various alternative implementations. For example, in various embodiments, the transport directive receiving module 204\* may further include a transport directive network receiving module 310, an end user preference data receiving module 312, a discount transport rate data receiving module 314, and/or an end user data receiving module 316. Specific details related to the transport directive receiving module 204" as well as the above-described sub-module of the transport directive receiving module 204\* will be provided below with respect to the operations and processes to be described herein.

Figure 3C:
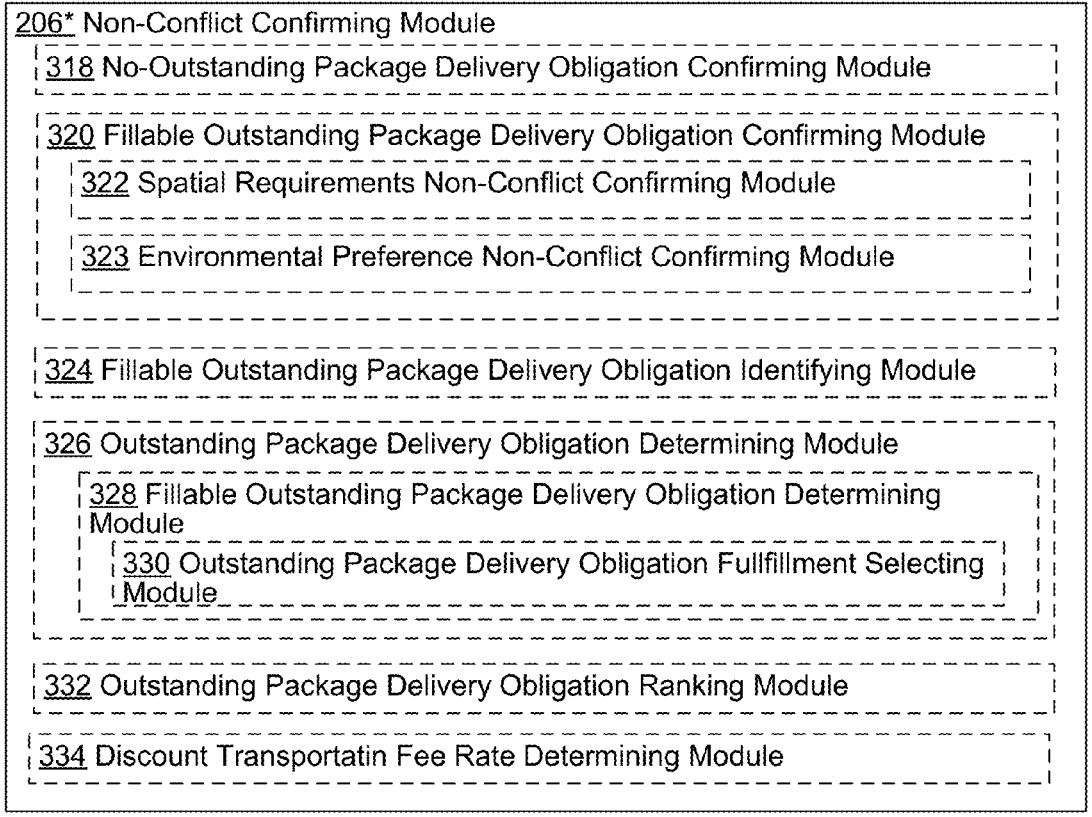
FIG. 3C shows another perspective of the non-conflict confirming module 206* of FIGS. 2A and 2B (e.g., the non-conflict confirming module 206' of FIG. 2A or the non-conflict confirming module 206" of FIG. 2B) in accordance with various embodiments.

FIG. 3C illustrates a particular implementation of the non-conflict confirming module 206\* (e.g., the non-conflict confirming module 206' or the non-conflict confirming module 206") of FIG. 2A or 2B. As illustrated, the non-conflict confirming module 206\* may include one or more sub-logic modules in various alternative implementations. For example, in various embodiments, the non-conflict confirming module 206\* may further include a no-outstanding package delivery obligation confirming module 318, a fillable outstanding package delivery obligation confirming module 320 that may further include a spatial requirements non-conflict confirming module 322 and/or an environmental preference non-conflict confirming module 323, a fillable outstanding package delivery obligation identifying module 324, an outstanding package delivery obligation determining module 326 that may further include a fillable outstanding package delivery obligation determining module 328 (which may further include an outstanding package delivery obligation fulfillment selecting module 330), an outstanding package delivery obligation ranking module 332, and/or a discount transportation fee rate determining module 334. Specific details related to the non-conflict confirming module 206\* as well as the above-described sub-modules of the non-conflict confirming module 206\* will be provided below with respect to the operations and processes to be described herein.

Figure 3D:
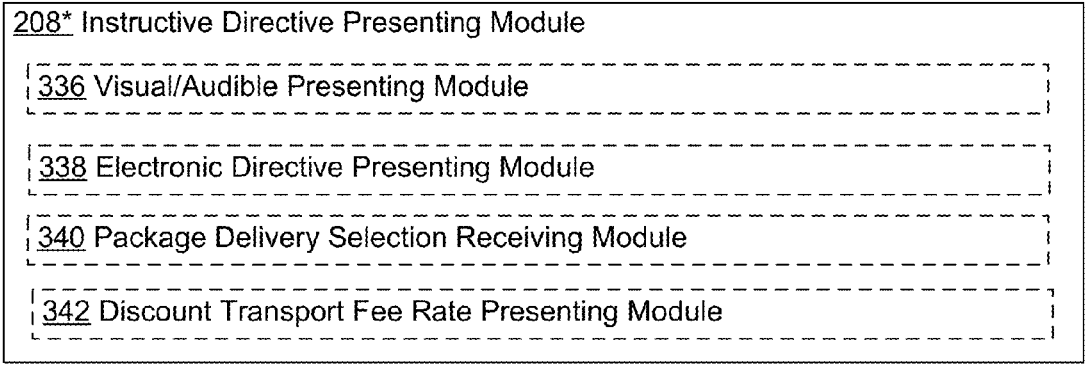
FIG. 3D shows another perspective of the instructive directive presenting module 208* of FIGS. 2A and 2B (e.g., the instructive directive presenting module 208' of FIG. 2A or the instructive directive presenting module 208" of FIG. 2B) in accordance with various embodiments.

FIG. 3D illustrates a particular implementation of the instructive directive presenting module 208\* (e.g., instructive directive presenting module 208' or the instructive directive presenting module 208") of FIG. 2A or 2B. As illustrated, the instructive directive presenting module 208\* may include one or more sub-logic modules in various alternative implementations. For example, in various embodiments, the instructive directive presenting module 208\* may further include a visual/audible presenting module 336, an electronic directive presenting module 338, a package delivery selection receiving module 340, and/or a discount transport fee rate presenting module 342. Specific details related to the instructive directive presenting module 208" as well as the above-described sub-module of the instructive directive presenting module 208\* will be provided below with respect to the operations and processes to be described herein.

Referring now to FIG. 3E, which illustrates some of the types of information that may be included in some example package delivery directives/obligations that may be received (and accepted in some cases) by the transport computing device 10\*. Note that when a package delivery directive is received and/or accepted by a transport computing device 10\*, it may then become an obligation. FIG. 3E, in particular, shows the type of directive data that may be stored in cache memory once the transport computing device 10\* accepts package delivery directives. In this example illustration of FIG. 3E, three different package delivery directives are shown for three different packages (identified as package numbers 001, 002, and 002 in column 350). Column 352 shows the package pick-up locations for each of the packages, column 354 shows the package delivery locations for each of the packages, column 356 shows the deadlines for dropping off the packages, and column 358 shows package delivery preferences (e.g., preference that no heavy packages or objects be placed on top of the delivery package or be transported in air-conditioned environment) for each of the packages. Note that there is no package delivery preference for package number 001, while package number 002 does not have any delivery deadline associated with it. Of course, other types of parameters (e.g., delivery priorities, and so forth) and other package delivery preferences may be included with directives/obligations in other alternative embodiments.

Figure 4B:
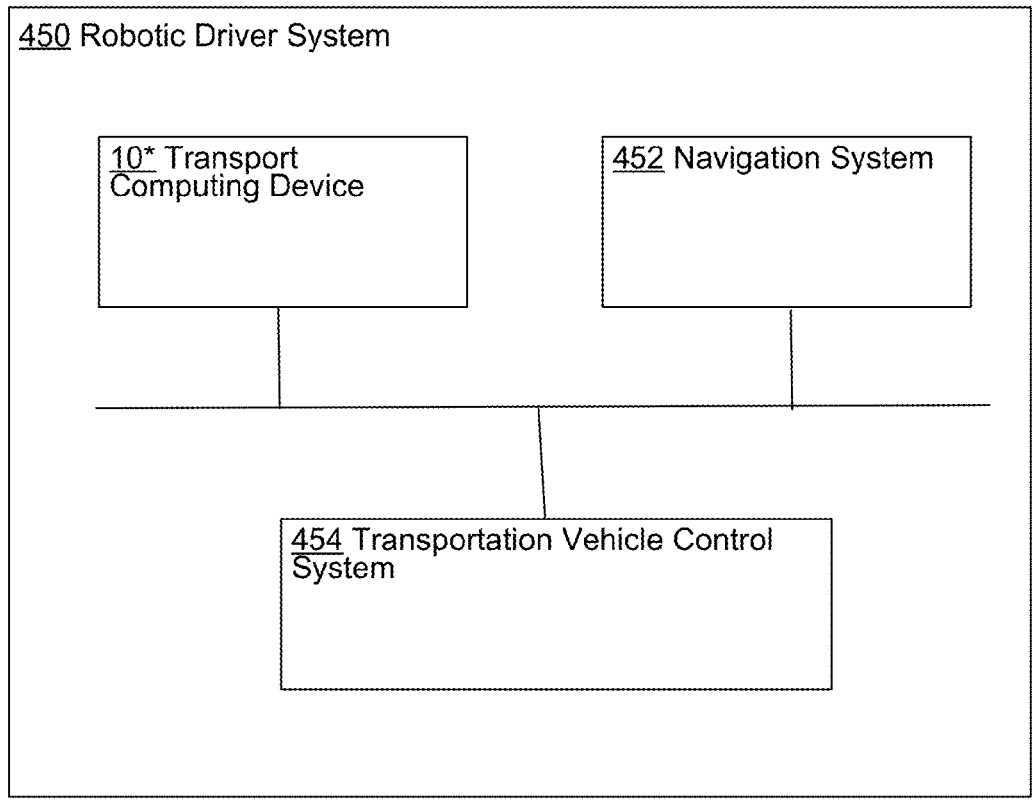
FIG. 4B illustrates an exemplary robotic driver system 450 that includes the transport computing device 10* of FIG. 2A or 2B.

Turning now to FIG. 4B, which illustrates a block diagram of a robotic driver system 450 that may be employed by a transportation vehicle unit 20. The robotic driver system 450 may be employed in order to replace a human driver and may include, among other things, a transport computing device 10\* of FIG. 2A or 2B, a navigation system 452, and a transportation vehicle control system 454. The navigation system 452 may be designed to provide navigational functionalities (e.g., plans routes to a destination location from a starting location, keeps track of the location of the transportation vehicle unit 20 using GPS data, and so forth) while the transportation vehicle control system 454 may be employed to control the various driving components (e.g., steering, gas, brakes, transmission, and so forth) of the vehicle portion (e.g., gas or electric powered vehicle) of the transportation vehicle unit 20.

Figure 5:
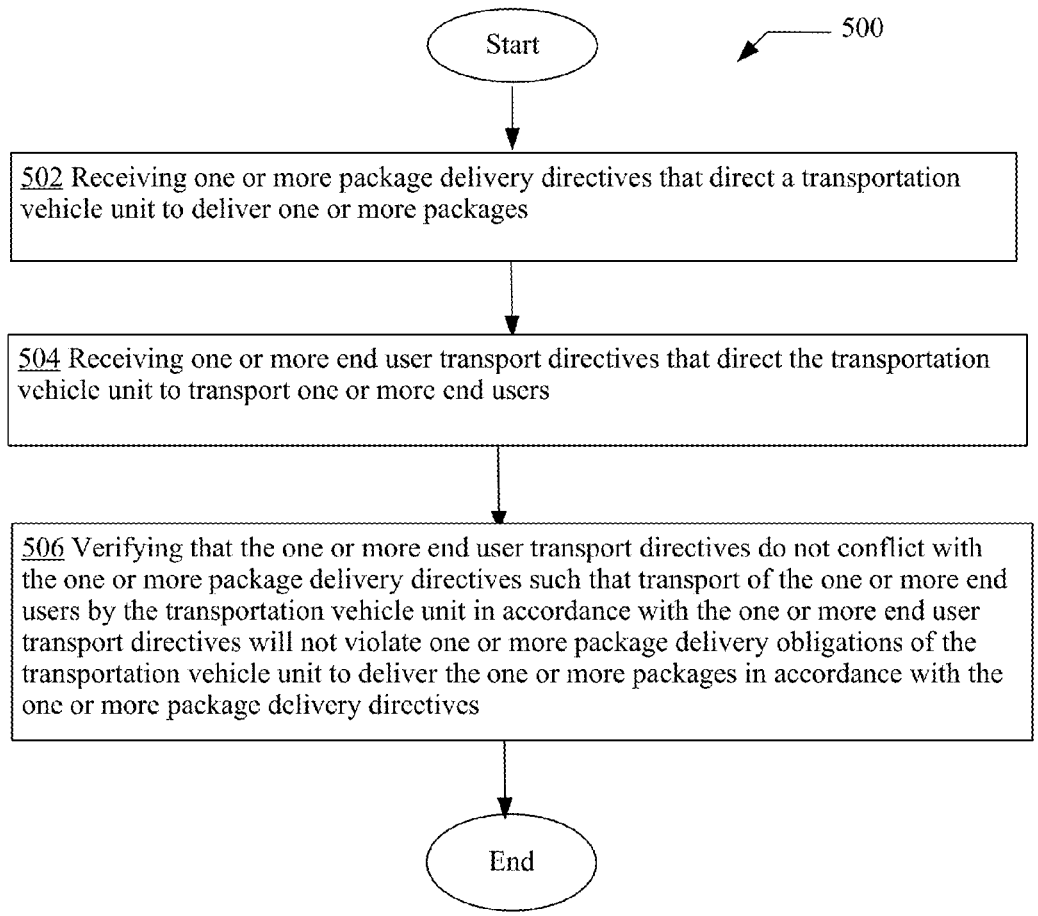
FIG. 5 is a high-level logic flowchart of a process, e.g., operational flow 500, according to some embodiments.

In the following, various operations associated with the above described transport computing device 10* (e.g., the transport computing device 10' of FIG. 2A or the transport computing device 10" of FIG. 2B) will be presented in accordance with various alternative embodiments. FIG. 5, for example, illustrates an operational flow 500 representing example computationally-implemented operations that may be implemented for, among other things, verifying that one or more end user transport directives that direct a transportation vehicle unit 20 to deliver one or more packages does not conflict with the one or more package delivery directives that direct the transportation vehicle unit 20 to transport one or more end users 12.

In FIG. 5 and in the following figures that include various examples of operational flows, discussions and explanations will be provided with respect to the transport computing device 10* described above and as illustrated in FIGS. 2A, 2B, 3A, 3B, 3C, 3D, and 3E, and/or with respect to other examples (e.g., as provided in FIGS. 1 and 4A and 4B) and contexts. However, it should be understood that the operational flows may be executed in a number of other environments and contexts, and/or in modified versions of FIGS. 1, 2A, 2B, 3A, 3B, 3C, 3D, 3E, 4A, and/or 4B. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a package delivery directive receiving operation 502 for receiving one or more package delivery directives that direct a transportation vehicle unit to deliver one or more packages. For instance, and as illustration, the package delivery directive receiving module 202* of the transport computing device 10* of FIG. 2A or 2B (e.g., the package delivery directive receiving module 202' of FIG. 2A or the package delivery directive receiving module 202" of FIG. 2B) receiving one or more package delivery directives that direct (e.g., instruct) a transportation vehicle unit 20 to deliver one or more packages (e.g., parcels). As will be further described below, the one or more package delivery directives that are received may provide various information including pickup location or locations for securing one or more packages that are to be delivered, one or more delivery locations where the one or more packages are to be delivered, deadlines for delivering the one or more packages, and so forth. In various implementations, the one or more package delivery directives may be received from a network entity (e.g., a package delivery service server 17, a passenger/package transport management system 16, or a transport coordinating system 15 of FIG. 1) or may be entered by a human driver associated with the transportation vehicle unit 20.

Operational flow 500 may also include a transport directive receiving operation 504 for receiving one or more end user transport directives that direct the transportation vehicle unit to transport one or more end users. For instance, the transport directive receiving module 204* (e.g., the transport directive receiving module 204' of FIG. 2A or the transport directive receiving module 204" of FIG. 2B) of the transport computing device 10* of FIG. 2A or 2B receiving one or more end user transport directives that direct the transportation vehicle unit 20 to transport one or more end users 12. In various embodiments, and as will be further described below, various information may be provided by the one or more end user transport directives including, for example, pickup location or locations (e.g., rendezvous location or locations) for rendezvousing with the one or more end users 12, the end user destination location or locations of the one or more end users 12, end user preferences as to the number of package deliveries that are permitted during transport of the one or more end users 12, and so forth.

As further illustrated in FIG. 5, operational flow 500 may further include a non-conflict verifying operation 506 for verifying that the one or more end user transport directives do not conflict with the one or more package delivery directives such that transport of the one or more end users by the transportation vehicle unit in accordance with the one or more end user transport directives will not violate one or more package delivery obligations of the transportation vehicle unit to deliver the one or more packages in accordance with the one or more package delivery directives. For instance, the non-conflict confirming module 206* (e.g., the non-conflict confirming module 206' of FIG. 2A or the non-conflict confirming module 206" of FIG. 2B) of the transport computing device 10* of FIG. 2A or 2B verifying or confirming that the one or more end user transport directives do not conflict with the one or more package delivery directives such that transport of the one or more end users 12 by the transportation vehicle unit 20 in accordance with the one or more end user transport directives will not violate (e.g., will not conflict with) one or more package delivery obligations of the transportation vehicle unit 20 to deliver the one or more packages in accordance with the one or more package delivery directives. For example, verifying that the transportation vehicle unit 20 can still fulfill an outstanding package delivery obligation that requires the transportation vehicle unit 20 to deliver a package to a particular package delivery location by a particular time even if the transportation vehicle unit 20 transports one or more end users 12 to an end user destination location.

Figure 6A:
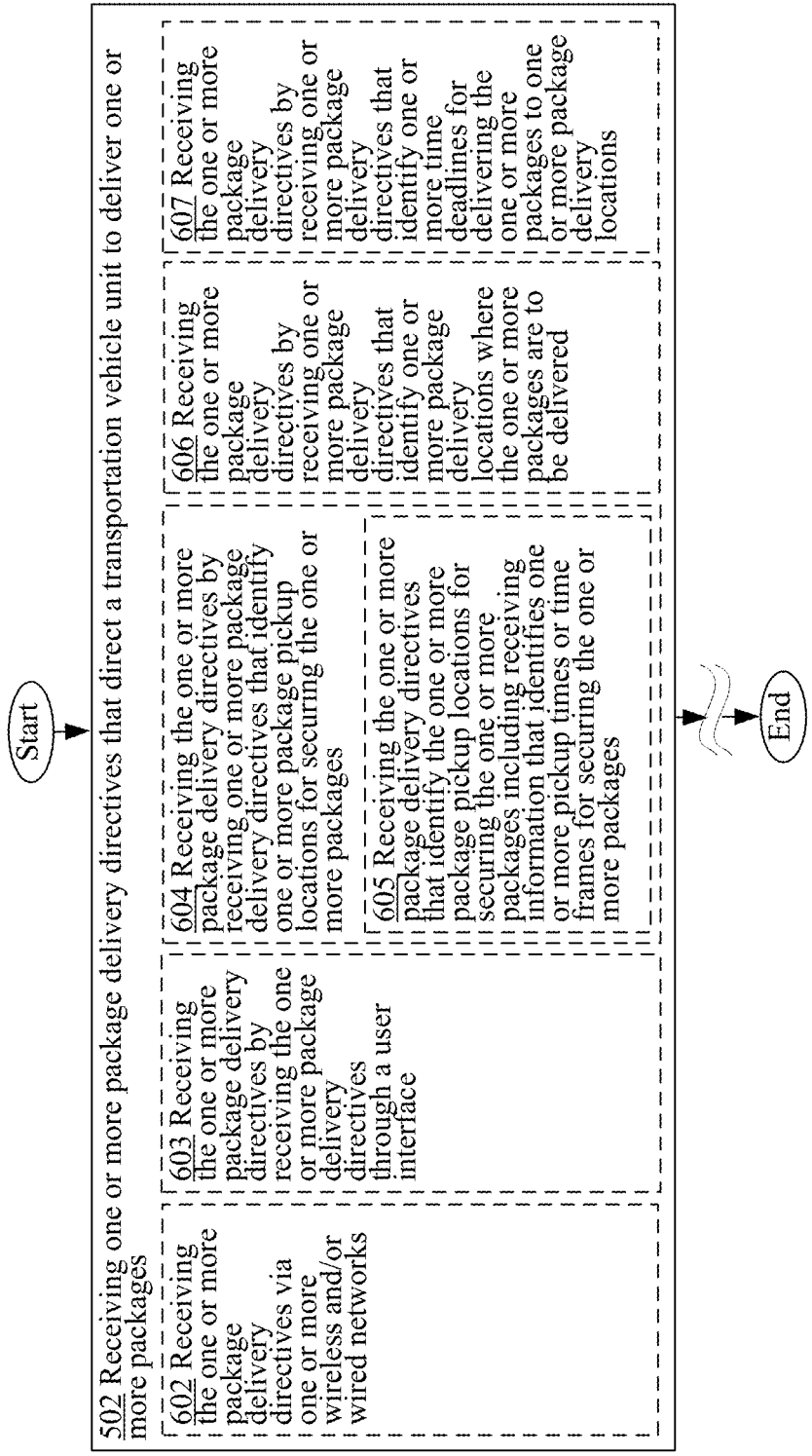
FIG. 6A is a high-level logic flowchart of a process depicting alternate implementations of the package delivery directive receiving operation 502 of FIG. 5.
Figure 6B:
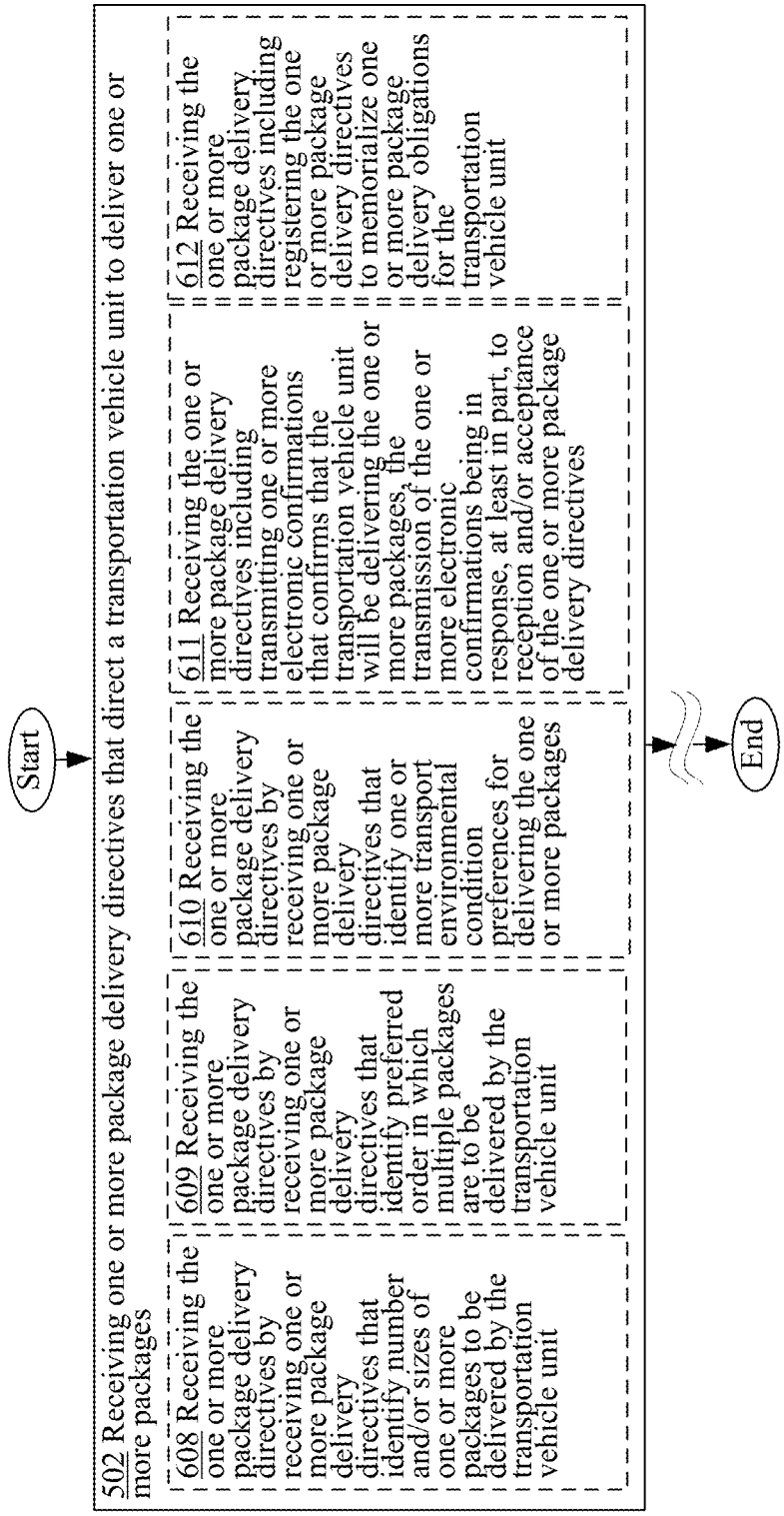
FIG. 6B is a high-level logic flowchart of a process depicting alternate implementations of the package delivery directive receiving operation 502 of FIG. 5.

As will be described below, the package delivery directive receiving operation 502, the transport directive receiving operation 504, and the non-conflict verifying operation 506 may be executed in a variety of different ways in various alternative implementations. FIGS. 6A and 6B, for example, illustrate at least some of the alternative ways that the package delivery directive receiving operation 502 of FIG. 5 may be executed in various alternative implementations. In some cases, for example, the package delivery directive receiving operation 502 may include an operation 602 for receiving the one or more package delivery directives via one or more wireless and/or wired networks as illustrated in FIG. 6A. For instance, the package delivery directive network receiving module 302 (see FIG. 3A of the transport computing device 10\* (e.g., the transport computing device 10' of FIG. 2A or the transport computing device 10" of FIG. 2B) receiving the one or more package delivery directives via one or more wireless and/or wired networks 18 (e.g., cellular data network, WLAN, WAN, MAN (metropolitan area network), Ethernet, etc.). In some cases, the package delivery directive network receiving module 302 may control a network interface 240 in order to electronically receive the one or more package delivery directives.

In various implementations, the package delivery directive receiving operation 502 may include an operation 603 for receiving the one or more package delivery directives by receiving the one or more package delivery directives through a user interface. For instance, the package delivery directive receiving module 202\* including the package delivery directive user interface receiving module 304 (see FIG. 3A) of the transport computing device 10\* of FIG. 2A or 2B receiving the one or more package delivery directives when the package delivery directive user interface receiving module 304 receives the one or more package delivery directives through a user interface 250 (e.g., a touchscreen, a keypad, a microphone, and so forth). For example, if a human driver of the transportation vehicle unit 20 of FIG. 1 receives package delivery directives orally or by written communication then the human driver may enter the package delivery directives manually through the user interface 250.

In the same or alternative implementations, the package delivery directive receiving operation 502 may alternatively or additionally include an operation 604 for receiving the one or more package delivery directives by receiving one or more package delivery directives that identify one or more package pickup locations for securing the one or more packages. For instance, the package delivery directive receiving module 202\* of the transport computing device 10\* of FIG. 2A or 2B receiving the one or more package delivery directives by receiving one or more package delivery directives that identify one or more package pickup locations for securing the one or more packages (e.g., parcels).

In some cases, operation 604 may further include an operation 605 for receiving the one or more package delivery directives that identify the one or more package pickup locations for securing the one or more packages including receiving information that identifies one or more pickup times or time frames for securing the one or more packages. For instance, the package delivery directive receiving module 202\* of the transport computing device 10\* of FIG. 2A or 2B receiving the one or more package delivery directives that identify the one or more package pickup locations for securing the one or more packages including receiving information that identifies one or more pickup times or time frames (e.g., 5 AM to 6 AM) for securing the one or more packages.

In the same or alternative implementations, the package delivery directive receiving operation 502 may alternatively or additionally include an operation 606 for receiving the one or more package delivery directives by receiving one or more package delivery directives that identify one or more package delivery locations where the one or more packages are to be delivered. For instance, the package delivery directive receiving module 202\* of the transport computing device 10\* of FIG. 2A or 2B receiving the one or more package delivery directives by receiving one or more package delivery directives that identify one or more package delivery locations where the one or more packages are to be delivered.

In the same or alternative implementations, the package delivery directive receiving operation 502 may alternatively or additionally include an operation 607 for receiving the one or more package delivery directives by receiving one or more package delivery directives that identify one or more time deadlines for delivering the one or more packages to one or more package delivery locations. For instance, the package delivery directive receiving module 202\* of the transport computing device 10\* of FIG. 2A or 2B receiving the one or more package delivery directives by receiving one or more package delivery directives that identify one or more time deadlines (e.g., 6 PM or deliver between 4 PM and 5 PM) for delivering the one or more packages to one or more package delivery locations.

In the same or alternative implementations, the package delivery directive receiving operation 502 may alternatively or additionally include an operation 608 for receiving the one or more package delivery directives by receiving one or more package delivery directives that identify number and/or sizes of one or more packages to be delivered by the transportation vehicle unit as illustrated in FIG. 6B. For instance, the package delivery directive receiving module 202\* of the transport computing device 10\* of FIG. 2A or 2B receiving the one or more package delivery directives by receiving one or more package delivery directives that identify number and/or sizes of the one or more packages assigned to be delivered by the transportation vehicle unit 20.

In the same or alternative implementations, the package delivery directive receiving operation 502 may alternatively or additionally include an operation 609 for receiving the one or more package delivery directives by receiving one or more package delivery directives that identify preferred order in which multiple packages are to be delivered by the transportation vehicle unit. For instance, the package delivery directive receiving module 202\* of the transport computing device 10\* of FIG. 2A or 2B receiving the one or more package delivery directives by receiving one or more package delivery directives that identify preferred order in which multiple packages are to be delivered to multiple package delivery locations by the transportation vehicle unit 20. For example, if the packages to be delivered have different delivery priorities (e.g., express mail as opposed to first class mail), then those packages having higher priorities may be delivered first before lower priority packages are delivered.

In the same or alternative implementations, the package delivery directive receiving operation 502 may alternatively or additionally include an operation 610 for receiving the one or more package delivery directives by receiving one or more package delivery directives that identify one or more transport environmental condition preferences for delivering the one or more packages. For instance, the package delivery directive receiving module 202* of the transport computing device 10* of FIG. 2A or 2B receiving the one or more package delivery directives by receiving one or more package delivery directives that identify one or more transport environmental condition preferences (e.g., packages are to be delivered in air-conditioned environment or no smoking environment) for delivering the one or more packages.

In the same or alternative implementations, the package delivery directive receiving operation 502 may alternatively or additionally include an operation 611 for receiving the one or more package delivery directives including transmitting one or more electronic confirmations that confirms that the transportation vehicle unit will be delivering the one or more packages, the transmission of the one or more electronic confirmations being in response, at least in part, to reception and/or acceptance of the one or more package delivery directives. For instance, the package delivery directive receiving module 202* including the confirmation transmitting module 306 (see FIG. 3A) of the transport computing device 10* of FIG. 2A or 2B receiving the one or more package delivery directives including transmitting, by the confirmation transmitting module 306, one or more electronic confirmations that confirms that the transportation vehicle unit 20* will be delivering the one or more packages, the transmission of the one or more electronic confirmations being in response, at least in part, to reception and/or acceptance (e.g., acceptance by a human driver or by the logic of the transport computing device 10*) of the one or more package delivery directives. For example, the transport computing device 10* of FIG. 1 may transmit one or more electronic confirmations to the transport coordinating system 15, to the passenger/package transport management system 16, and/or to the package delivery service server 17 upon acceptance of one or more package delivery directives to deliver one or more packages.

In the same or alternative implementations, the package delivery directive receiving operation 502 may alternatively or additionally include an operation 612 for receiving the one or more package delivery directives including registering the one or more package delivery directives to memorialize one or more package delivery obligations for the transportation vehicle unit. For instance, the package delivery directive receiving module 202* including the directive registering module 308 (see FIG. 3A) of the transport computing device 10* of FIG. 2A or 2B receiving the one or more package delivery directives including registering (e.g., storing), by directive registering module 308, the one or more package delivery directives to memorialize one or more package delivery obligations for the transportation vehicle unit 20.

Figure 7A:
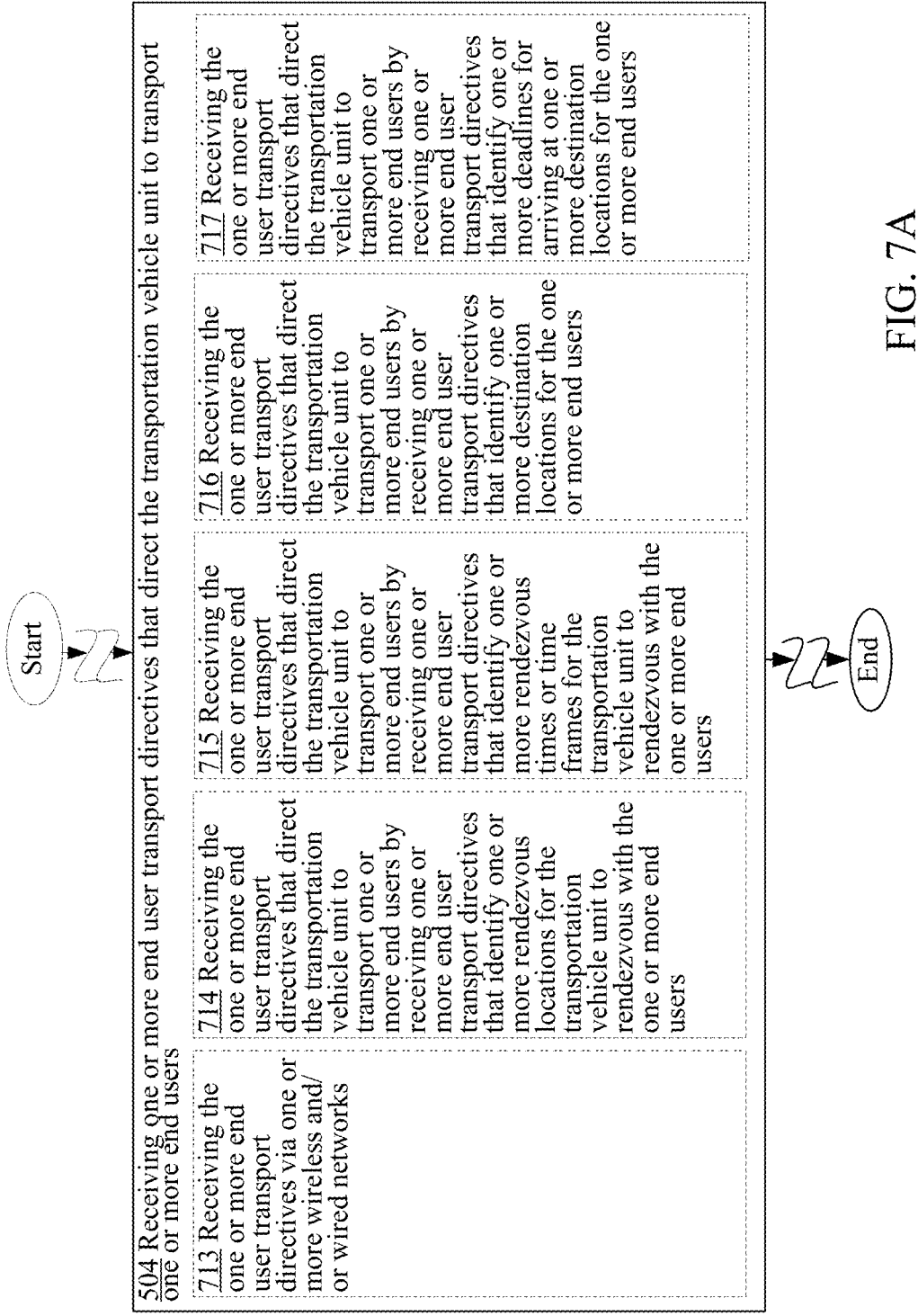
FIG. 7A is a high-level logic flowchart of a process depicting alternate implementations of the transport directive receiving operation 504 of FIG. 5.

Referring back to the transport directive receiving operation 504 of FIG. 5, the transport directive receiving operation 504 similar to the package delivery directive receiving operation 502 of FIG. 5 may be executed in a number of different ways in various alternative embodiments as illustrated, for example, in FIGS. 7A, 7B, 7C, and 7D. In some cases, for example, the transport directive receiving operation 504 may include an operation 713 for receiving the one or more end user transport directives via one or more wireless and/or wired networks as illustrated in FIG. 7A. For instance, transport directive network receiving module 310 (see FIG. 3B) of the transport computing device 10* of FIG. 2A or 2B receiving the one or more end user transport directives via one or more wireless and/or wired networks 18.

In the same or alternative implementations, the transport directive receiving operation 504 may alternatively or additionally include an operation 714 for receiving the one or more end user transport directives that direct the transportation vehicle unit to transport one or more end users by receiving one or more end user transport directives that identify one or more rendezvous locations for the transportation vehicle unit to rendezvous with the one or more end users. For instance, the transport directive receiving module 204* of the transport computing device 10* of FIG. 2A or 2B receiving the one or more end user transport directives that direct (e.g., instructs) the transportation vehicle unit 20 to transport one or more end users 12 by receiving one or more end user transport directives that identify one or more rendezvous locations for the transportation vehicle unit 20 to rendezvous with the one or more end users 12.

In the same or alternative implementations, the transport directive receiving operation 504 may alternatively or additionally include an operation 715 for receiving the one or more end user transport directives that direct the transportation vehicle unit to transport one or more end users by receiving one or more end user transport directives that identify one or more rendezvous times or time frames for the transportation vehicle unit to rendezvous with the one or more end users. For instance, the transport directive receiving module 204* of the transport computing device 10* of FIG. 2A or 2B receiving the one or more end user transport directives that direct (e.g., instructs) the transportation vehicle unit 20 to transport one or more end users 12 by receiving one or more end user transport directives that identify one or more rendezvous times or time frames (e.g., 9:20 AM or "15 minutes from now") for the transportation vehicle unit 20 to rendezvous with the one or more end users 12.

In the same or alternative implementations, the transport directive receiving operation 504 may additionally or alternatively include an operation 716 for receiving the one or more end user transport directives that direct the transportation vehicle unit to transport one or more end users by receiving one or more end user transport directives that identify one or more destination locations for the one or more end users. For instance, the transport directive receiving module 204* of the transport computing device 10* of FIG. 2A or 2B receiving the one or more end user transport directives that direct (e.g., instructs) the transportation vehicle unit 20 to transport one or more end users 12 by receiving one or more end user transport directives that identify one or more destination locations for the one or more end users 12.

In the same or alternative implementations, the transport directive receiving operation 504 may additionally or alternatively include an operation 717 for receiving the one or more end user transport directives that direct the transportation vehicle unit to transport one or more end users by receiving one or more end user transport directives that identify one or more deadlines for arriving at one or more destination locations for the one or more end users. For instance, the transport directive receiving module 204* of the transport computing device 10* of FIG. 2A or 2B receiving the one or more end user transport directives that direct (e.g., instructs) the transportation vehicle unit 20 to transport one or more end users 12 by receiving one or more end user transport directives that identify one or more deadlines for arriving at one or more destination locations for the one or more end users 12.

Figure 7B:
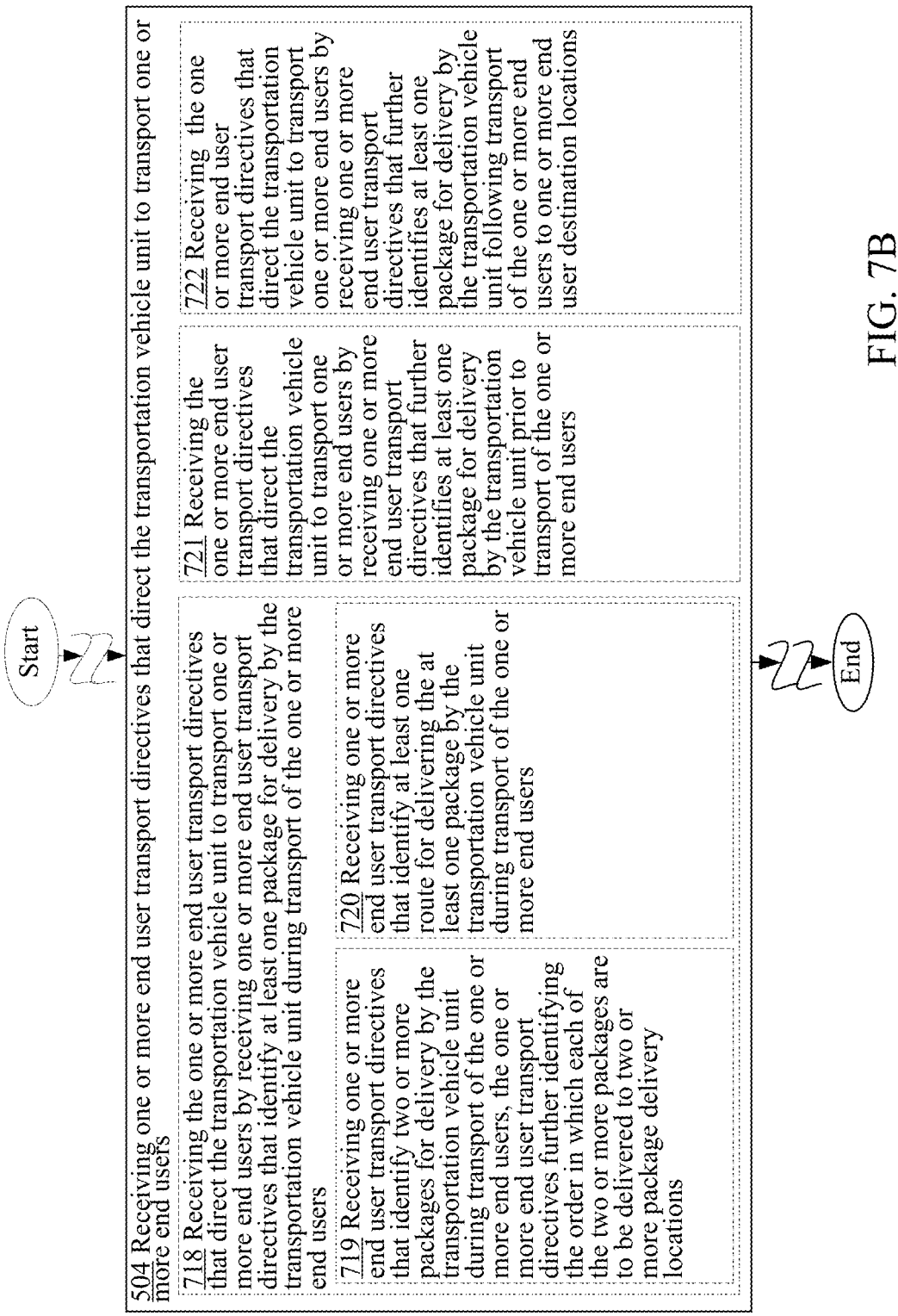
FIG. 7B is a high-level logic flowchart of a process depicting alternate implementations of the transport directive receiving operation 504 of FIG. 5.

In the same or alternative implementations, the transport directive receiving operation 504 may additionally or alternatively include an operation 718 for receiving the one or more end user transport directives that direct the transportation vehicle unit to transport one or more end users by receiving one or more end user transport directives that identify at least one package for delivery by the transportation vehicle unit during transport of the one or more end users as illustrated in FIG. 7B. For instance, the transport directive receiving module 204\* of the transport computing device 10\* of FIG. 2A or 2B receiving the one or more end user transport directives that direct (e.g., instructs) the transportation vehicle unit 20 to transport one or more end users 12 by receiving one or more end user transport directives that identify at least one package (from the one or more packages) for delivery by the transportation vehicle unit 20 during transport of the one or more end users 12, the at least one package to be delivered to a package delivery location that is different from one or more destination locations of the one or more end users 12.

In some implementations, operation 718 may further include an operation 719 for receiving one or more end user transport directives that identify two or more packages for delivery by the transportation vehicle unit during transport of the one or more end users, the one or more end user transport directives further identifying order in which each of the two or more packages are to be delivered to two or more package delivery locations. For instance, the transport directive receiving module 204\* of the transport computing device 10\* of FIG. 2A or 2B receiving one or more end user transport directives that identify two or more packages for delivery by the transportation vehicle unit 20 during transport of the one or more end users 12, the one or more end user transport directives further identifying the order in which each of the two or more packages are to be delivered to two or more package delivery locations.

In some cases, operation 718 may additionally or alternatively include an operation 720 for receiving one or more end user transport directives that identify at least one route for delivering the at least one package by the transportation vehicle unit during transport of the one or more end users. For instance, the transport directive receiving module 204\* of the transport computing device 10\* of FIG. 2A or 2B receiving one or more end user transport directives that identify at least one route (e.g., a detour route from a direct route for transporting the one or more end users 12 to their destination location) for delivering the at least one package by the transportation vehicle unit 20 during transport of the one or more end users 12.

In the same or alternative implementations, the transport directive receiving operation 504 may include an operation 721 for receiving the one or more end user transport directives that direct the transportation vehicle unit to transport one or more end users by receiving one or more end user transport directives that further identifies at least one package for delivery by the transportation vehicle unit prior to transport of the one or more end users. For instance, the transport directive receiving module 204\* of the transport computing device 10\* of FIG. 2A or 2B receiving the one or more end user transport directives that direct the transportation vehicle unit 20 to transport one or more end users 12 by receiving one or more end user transport directives that further identifies at least one package (from the one or more packages) for delivery by the transportation vehicle unit 20 prior to transport of the one or more end users 12 (e.g., prior to the transportation vehicle unit 20 rendezvousing with the one or more end users 12 at one or more rendezvous locations in order to transport the one or more end users 12 to one or more end user destination locations).

In the same or alternative implementations, the transport directive receiving operation 504 may include an operation 722 for receiving the one or more end user transport directives that direct the transportation vehicle unit to transport one or more end users by receiving one or more end user transport directives that further identifies at least one package for delivery by the transportation vehicle unit following transport of the one or more end users to one or more end user destination locations. For instance, the transport directive receiving module 204\* of the transport computing device 10\* of FIG. 2A or 2B receiving the one or more end user transport directives that direct the transportation vehicle unit 20 to transport one or more end users 12 by receiving one or more end user transport directives that further identifies at least one package for delivery by the transportation vehicle unit 20 following transport of the one or more end users 12 to one or more end user destination locations.

Figure 7C:
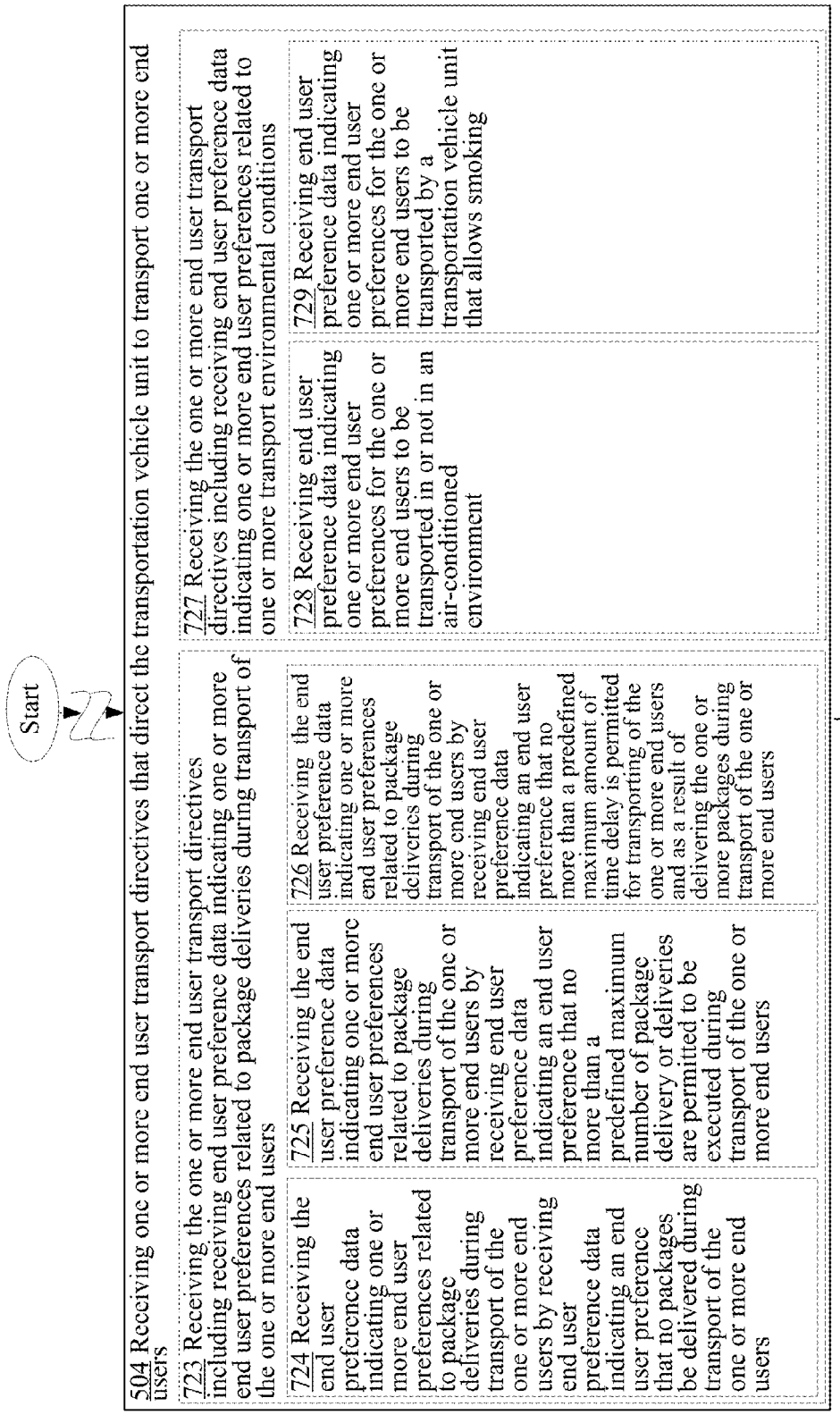
FIG. 7C is a high-level logic flowchart of a process depicting alternate implementations of the transport directive receiving operation 504 of FIG. 5.

Referring now to FIG. 7C, in the same or alternative implementations, the transport directive receiving operation 504 may include an operation 723 for receiving the one or more end user transport directives including receiving end user preference data indicating one or more end user preferences related to package deliveries during transport of the one or more end users. For instance, the transport directive receiving module 204\* including the end user preference data receiving module 312 (see FIG. 3B) of the transport computing device 10\* of FIG. 2A or 2B receiving (e.g., electronically receiving via one or more wireless and/or wired networks 18) the one or more end user transport directives including receiving, by the end user preference data receiving module 312, end user preference data indicating one or more end user preferences related to package deliveries (e.g., no packages or parcels be transported in the passenger cabin) during transport of the one or more end users 12. Note that in some cases, the one or more end user preferences may be received separately from the one or more end user transport directives.

As further illustrated in FIG. 7C, in various implementations, operation 723 may further include one or more additional operations including, in some cases, an operation 724 for receiving the end user preference data indicating one or more end user preferences related to package deliveries during transport of the one or more end users by receiving end user preference data indicating an end user preference that no packages be delivered during transport of the one or more end users. For instance, the end user preference data receiving module 312 of the transport computing device 10\* of FIG. 2A or 2B receiving the end user preference data indicating one or more end user preferences related to package deliveries during transport of the one or more end users 12 by receiving end user preference data indicating an end user preference that no packages be delivered during transport of the one or more end users 12 from one or more rendezvous locations to one or more end user destination locations.

In some alternative implementations, operation 723 may include an operation 725 for receiving the end user preference data indicating one or more end user preferences related to package deliveries during transport of the one or more end users by receiving end user preference data indicating an end user preference that no more than a predefined maximum number of package delivery or deliveries are permitted to be executed during transport of the one or more end users. For instance, the end user preference data receiving module 312 of the transport computing device 10\* of FIG. 2A or 2B receiving the end user preference data indicating one or more end user preferences related to package deliveries during transport of the one or more end users by receiving end user preference data indicating an end user preference that no more than a predefined maximum number of package delivery or deliveries are permitted to be executed (e.g., up to two package deliveries may be allowed during transport of the one or more end users) during transport of the one or more end users 12.

In the same or alternative implementations, operation 723 may include an operation 726 for receiving the end user preference data indicating one or more end user preferences related to package deliveries during transport of the one or more end users by receiving end user preference data indicating an end user preference that no more than a predefined maximum amount of time delay is permitted for transporting of the one or more end users and as a result of delivering the one or more packages during transport of the one or more end users. For instance, the end user preference data receiving module 312 of the transport computing device 10\* of FIG. 2A or 2B receiving the end user preference data indicating one or more end user preferences related to package deliveries during transport of the one or more end users 12 by receiving end user preference data indicating an end user preference that no more than a predefined maximum amount of time delay is permitted (allowed) for transporting of the one or more end users 12 and as a result of delivering the one or more packages during transport of the one or more end users 12. For example, receiving an end user preference that no more than 15 minutes of time delay will be permitted for delivering packages during transport of the one or more end users 12.

In some implementations, the transport directive receiving operation 504 may include an operation 727 for receiving the one or more end user transport directives including receiving end user preference data indicating one or more end user preferences related to one or more transport environmental conditions. For instance, the transport directive receiving module 204\* including the end user preference data receiving module 312 of the transport computing device 10\* of FIG. 2A or 2B receiving the one or more end user transport directives including receiving, by the end user preference data receiving module 312, end user preference data indicating one or more end user preferences related to one or more transport environmental conditions (e.g., passenger cabin environmental conditions).

In some implementations operation 727 may actually involve an operation 728 for receiving end user preference data indicating one or more end user preferences for the one or more end users to be transported in or not in an air-conditioned environment. For instance, the end user preference data receiving module 312 of the transport computing device 10\* of FIG. 2A or 2B receiving end user preference data indicating one or more end user preferences for the one or more end users 12 to be transported in or not in an air-conditioned environment.

In the same or alternative implementations, operation 727 may include an operation 729 for receiving end user preference data indicating one or more end user preferences for the one or more end users to be transported by a transportation vehicle unit that allows smoking. For instance, the end user preference data receiving module 312 of the transport computing device 10\* of FIG. 2A or 2B receiving end user preference data indicating one or more end user preferences for the one or more end users 12 to be transported by a transportation vehicle unit 20 that permits smoking (e.g., cigarette smoking) by passengers.

Figure 7D:
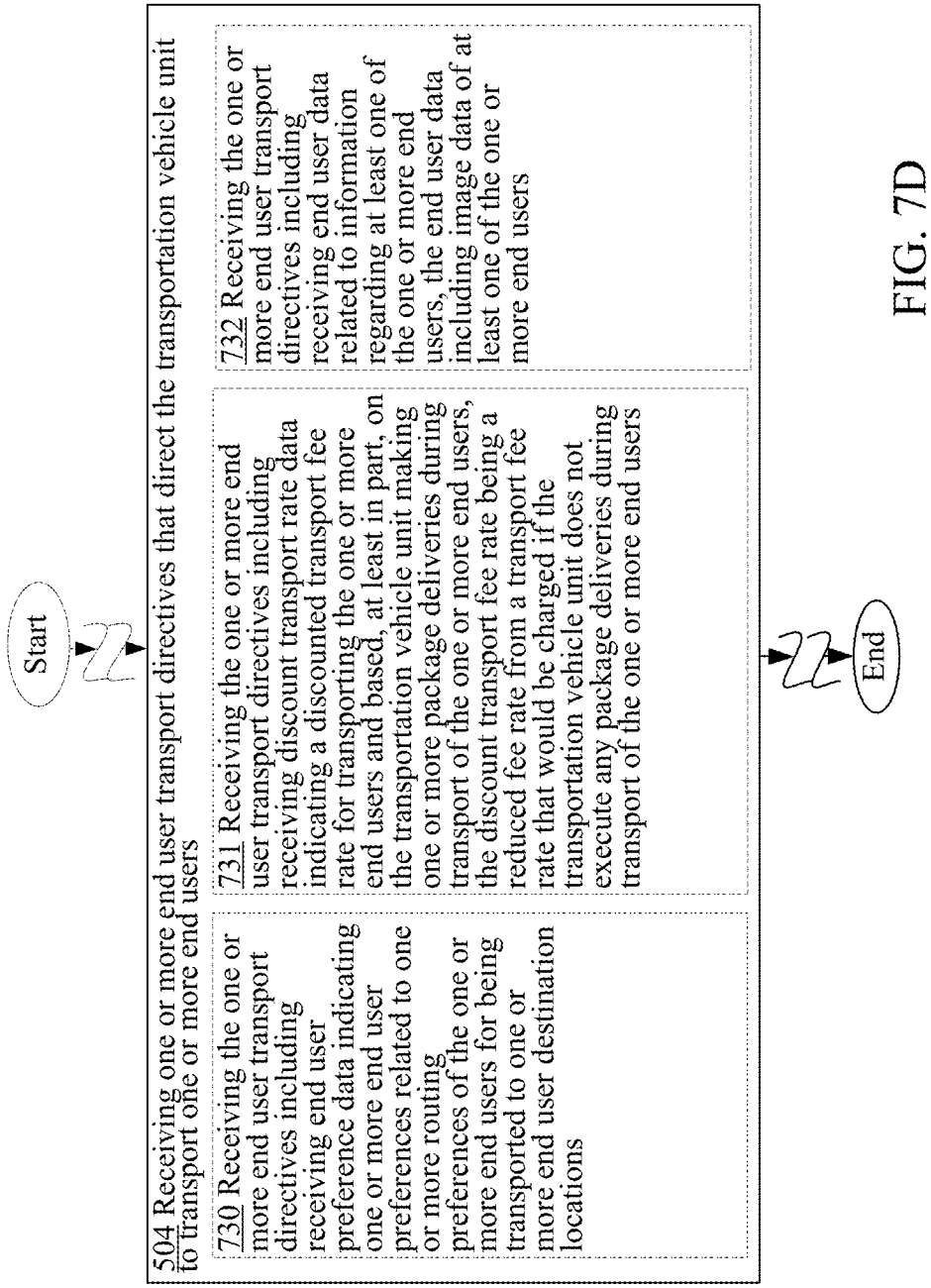
FIG. 7D is a high-level logic flowchart of a process depicting alternate implementations of the transport directive receiving operation 504 of FIG. 5.

Turning to FIG. 7D, in various implementations, the transport directive receiving operation 504 may include an operation 730 for receiving the one or more end user transport directives including receiving end user preference data indicating one or more end user preferences related to one or more routing preferences of the one or more end users for being transported to one or more end user destination locations For instance, the transport directive receiving module 204\* including the end user preference data receiving module 312 of the transport computing device 10\* of FIG. 2A or 2B receiving the one or more end user transport directives including receiving, by the end user preference data receiving module 312, end user preference data indicating one or more end user preferences related to one or more routing preferences (e.g., preference that a particular location or roads be avoided, preference that certain location be used as a rendezvous location for the one or more end users 12 to rendezvous with the transportation vehicle unit 20) of the one or more end users 12 for being transported to one or more end user destination locations.

In the same or alternative implementations, the transport directive receiving operation 504 may include an operation 731 for receiving the one or more end user transport directives including receiving discount transport rate data indicating a discounted transport fee rate for transporting the one or more end users and based, at least in part, on the transportation vehicle unit making one or more package deliveries during transport of the one or more end users, the discount transport fee rate being a reduced fee rate from a transport fee rate that would be charged if the transportation vehicle unit does not execute any package deliveries during transport of the one or more end users. For instance, the transport directive receiving module 204\* including the discount transport rate data receiving module 314 (see FIG. 3B) of the transport computing device 10\* of FIG. 2A or 2B receiving the one or more end user transport directives including receiving, by the discount transport rate data receiving module 314, discount transport rate data indicating a discounted transport fee rate for transporting the one or more end users 12 and based, at least in part, on the transportation vehicle unit 20 making one or more package deliveries during transport of the one or more end users 12, the discount transport fee rate (e.g., a discounted rate that is 20 percent less than a nominal transport fee rate) being a reduced fee rate from a nominal transport fee rate that would be charged if the transportation vehicle unit 20 does not execute any package deliveries during transport of the one or more end users 12. Note that in some cases, the discount transport rate data may be received separately from the one or more end user transport directives.

In the same or alternative implementations, the transport directive receiving operation 504 may include an operation 732 for receiving the one or more end user transport directives including receiving end user data related to information regarding at least one of the one or more end users, the end user data including image data of at least one of the one or more end users. For instance, the transport directive receiving module 204\* including the end user data receiving module 316 (see FIG. 3B) of the transport computing device 10\* of FIG. 2A or 2B receiving the one or more end user transport directives including receiving, by the end user data receiving module 316, end user data related to information (e.g., name, passenger rating as provided by previous human drivers, and so forth) regarding at least one of the one or more end users 12, the end user data including image data of at least one of the one or more end users 12.

Figure 8A:
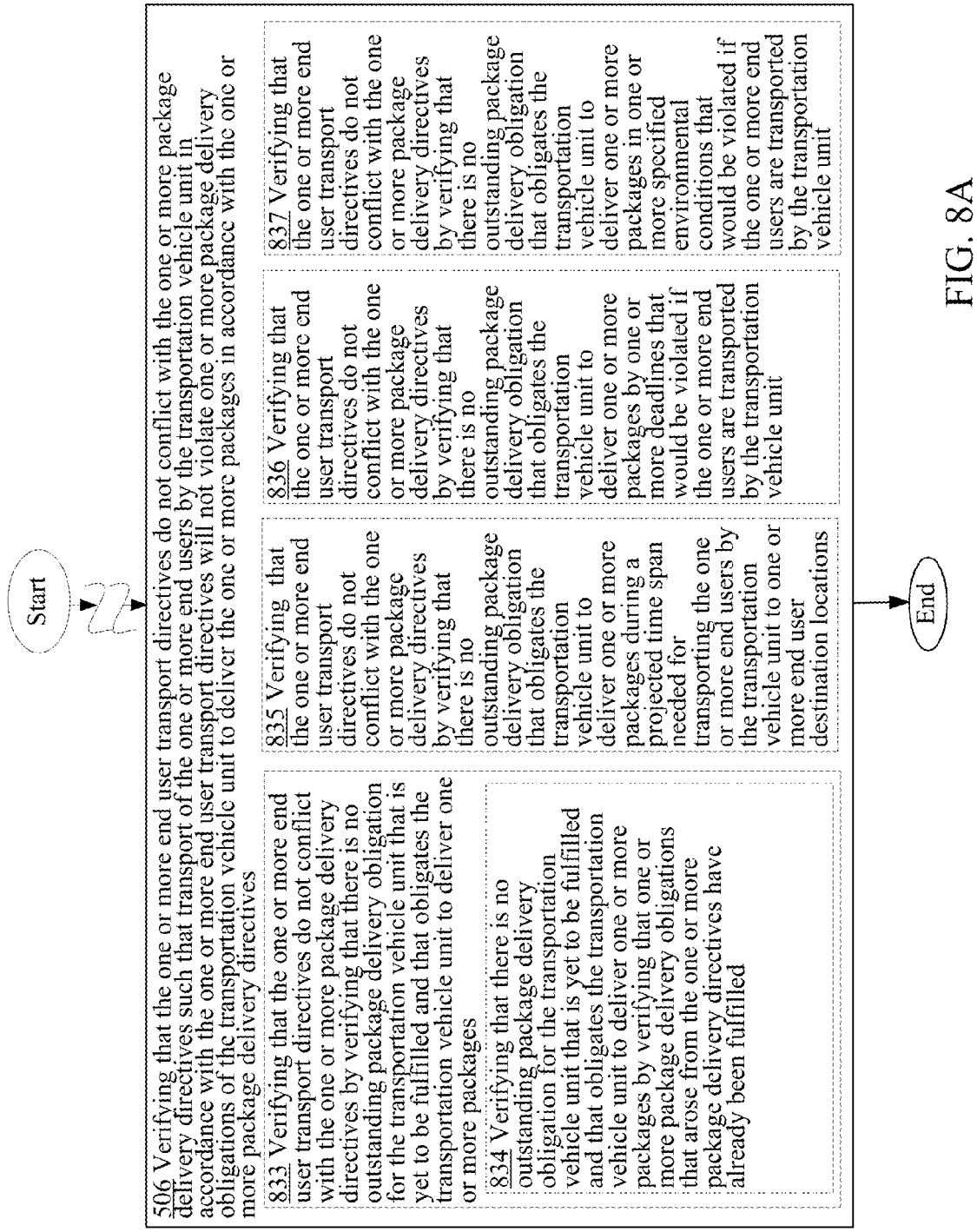
FIG. 8A is a high-level logic flowchart of a process depicting alternate implementations of the non-conflict verifying operation 506 of FIG. 5.

Referring back to the non-conflict verifying operation 506 of FIG. 5, the non-conflict verifying operation 506 similar to the package delivery directive receiving operation 502 and the transport directive receiving operation 504 of FIG. 5 may be executed in a number of different ways in various alternative embodiments as illustrated, for example, in FIGS. 8A, 8B, 8C, 8D, and 8E. In some cases, for example, the non-conflict verifying operation 506 may actually include an operation 833 for verifying that the one or more end user transport directives do not conflict with the one or more package delivery directives by verifying that there is no outstanding package delivery obligation for the transportation vehicle unit that is yet to be fulfilled and that obligates the transportation vehicle unit to deliver one or more packages as illustrated in FIG. 8A. For instance, the non-conflict confirming module 206* including the no-outstanding package delivery obligation confirming module 318 (see FIG. 3C) of the transport computing device 10* of FIG. 2A or 2B verifying that the one or more end user transport directives do not conflict with the one or more package delivery directives including verifying or confirming, by the no-outstanding package delivery obligation confirming module 318, that there is no outstanding package delivery obligation for the transportation vehicle unit 20 that is yet to be fulfilled and that still obligates the transportation vehicle unit 20 to deliver one or more packages. Note that in some cases an outstanding package delivery obligation may be fulfilled when one or more packages that are required to be delivered by the outstanding package delivery obligation are delivered to a package delivery location in accordance with the outstanding package delivery obligation.

As further illustrated in FIG. 8A, operation 833 in various implementations operation 833 may actually involve an operation 834 for verifying that there is no outstanding package delivery obligation for the transportation vehicle unit that is yet to be fulfilled and that obligates the transportation vehicle unit to deliver one or more packages by verifying that one or more package delivery obligations that arose from the one or more package delivery directives have already been fulfilled. For instance, the no-outstanding package delivery obligation confirming module 318 of the transport computing device 10* of FIG. 2A or 2B verifying that there is no outstanding package delivery obligation for the transportation vehicle unit 20 that is yet to be fulfilled and that obligates the transportation vehicle unit 20 to deliver one or more packages by verifying or confirming that one or more package delivery obligations that arose from the one or more package delivery directives have already been fulfilled.

In the same or alternative implementations, the non-conflict verifying operation 506 may include an operation 835 for verifying that the one or more end user transport directives do not conflict with the one or more package delivery directives by verifying that there is no outstanding package delivery obligation that obligates the transportation vehicle unit to deliver one or more packages during a projected time span needed for transporting the one or more end users by the transportation vehicle unit to one or more end user destination locations. For instance, the non-conflict confirming module 206* including the no-outstanding package delivery obligation confirming module 318 of the transport computing device 10* of FIG. 2A or 2B verifying that the one or more end user transport directives do not conflict with the one or more package delivery directives by verifying or confirming, by the no-outstanding package delivery obligation confirming module 318, that there is no outstanding package delivery obligation that obligates the transportation vehicle unit 20 to deliver one or more packages during a projected time span (e.g., estimated time) needed for transporting the one or more end users 12 by the transportation vehicle unit 20 to one or more end user destination locations.

In the same or alternative implementations, the non-conflict verifying operation 506 may include an operation 836 for verifying that the one or more end user transport directives do not conflict with the one or more package delivery directives by verifying that there is no outstanding package delivery obligation that obligates the transportation vehicle unit to deliver one or more packages by one or more deadlines that would be violated if the one or more end users are transported by the transportation vehicle unit. For instance, the non-conflict confirming module 206* including the no-outstanding package delivery obligation confirming module 318 of the transport computing device 10* of FIG. 2A or 2B verifying that the one or more end user transport directives do not conflict with the one or more package delivery directives by verifying or confirming, by the no-outstanding package delivery obligation confirming module 318, that there is no outstanding package delivery obligation that obligates the transportation vehicle unit 20 to deliver one or more packages by one or more time deadlines that would be violated if the one or more end users 12 are transported by the transportation vehicle unit 20. For example, the transportation vehicle unit 20 does not have any package delivery obligation that requires the delivery of a package to a distant package delivery location by a particular deadline (which may occur during or even after the amount of time needed to transport of the one or more end users 12) that cannot be fulfilled if the transportation vehicle unit 20 transports the one or more end users 12.

In the same or alternative implementations, the non-conflict verifying operation 506 may include an operation 837 for verifying that the one or more end user transport directives do not conflict with the one or more package delivery directives by verifying that there is no outstanding package delivery obligation that obligates the transportation vehicle unit to deliver one or more packages in one or more specified environmental conditions that would be violated if the one or more end users are transported by the transportation vehicle unit. For instance, the non-conflict confirming module 206* including the no-outstanding package delivery obligation confirming module 318 of the transport computing device 10* of FIG. 2A or 2B verifying that the one or more end user transport directives do not conflict with the one or more package delivery directives by verifying or confirming, by the no-outstanding package delivery obligation confirming module 318, that there is no outstanding package delivery obligation that obligates the transportation vehicle unit 20 to deliver one or more packages in one or more specified environmental conditions (e.g., air-conditioned environment as specified by the one or more received package delivery directives) that would be violated if the one or more end users 12 are transported by the transportation vehicle unit 20.

Figure 8B:
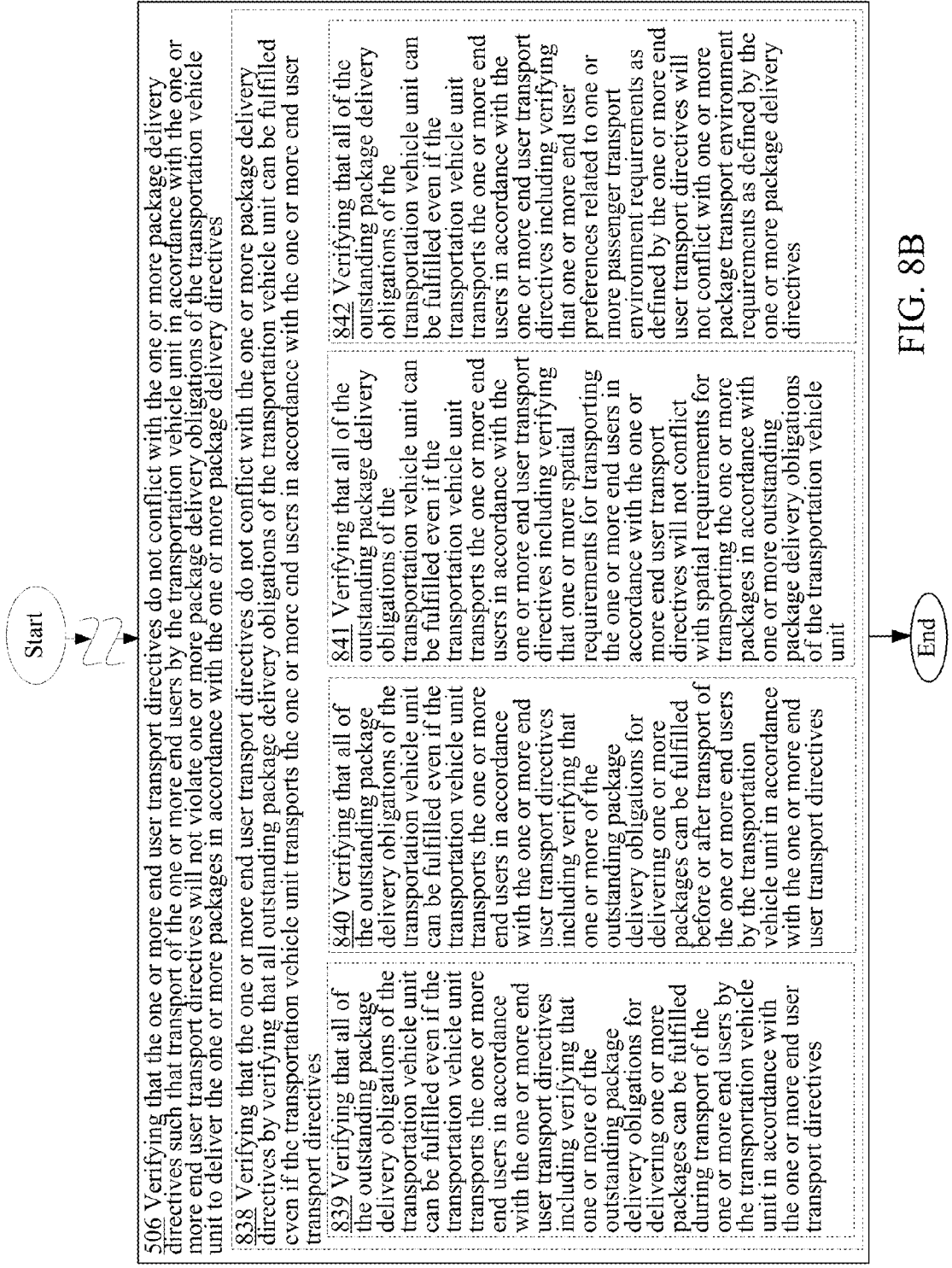
FIG. 8B is a high-level logic flowchart of a process depicting alternate implementations of the non-conflict verifying operation 506 of FIG. 5.

In the same or alternative implementations, the non-conflict verifying operation 506 may include an operation 838 for verifying that the one or more end user transport directives do not conflict with the one or more package delivery directives by verifying that all outstanding package delivery obligations of the transportation vehicle unit can be fulfilled even if the transportation vehicle unit transports the one or more end users in accordance with the one or more end user transport directives as illustrated in FIG. 8B. For instance, the non-conflict confirming module 206* including the fillable outstanding package delivery obligation confirming module 320 (see FIG. 3C) of the transport computing device 10* of FIG. 2A or 2B verifying that the one or more end user transport directives do not conflict with the one or more package delivery directives by having the fillable outstanding package delivery obligation confirming module 320 verify or confirm that all outstanding package delivery obligations of the transportation vehicle unit 20 can be fulfilled (e.g., can be fulfilled based on package delivery locations of the one or more packages to be delivered, based on deadlines for delivering the one or more packages, based on end user preferences related to package deliveries, and so forth) even if the transportation vehicle unit 20 transports the one or more end users 12 in accordance with the one or more end user transport directives.

As further illustrated in FIG. 8B, in various implementations, operation 838 may further include one or more additional operations including, in some cases, an operation 839 for verifying that all of the outstanding package delivery obligations of the transportation vehicle unit can be fulfilled even if the transportation vehicle unit transports the one or more end users in accordance with the one or more end user transport directives including verifying that one or more of the outstanding package delivery obligations for delivering one or more packages can be fulfilled during transport of the one or more end users by the transportation vehicle unit in accordance with the one or more end user transport directives. For instance, the fillable outstanding package delivery obligation confirming module 320 of the transport computing device 10* of FIG. 2A or 2B verifying that all of the outstanding package delivery obligations of the transportation vehicle unit 20 can be fulfilled even if the transportation vehicle unit 20 transports the one or more end users 12 in accordance with the one or more end user transport directives including verifying or confirming that one or more of the outstanding package delivery obligations for delivering one or more packages can be fulfilled (e.g., based on the drop-off or package delivery locations of one or more packages being transported by the transportation vehicle unit 20 relative to the route used to transport the one or more end users 12 to their destination location or locations, based on end user preferences related to package deliveries, based on the planned travel route for transporting the one or more end users 12, and so forth) during transport of the one or more end users 12 by the transportation vehicle unit 20 in accordance with the one or more end user transport directives. For example, suppose a package is scheduled to be delivered to a location along the transport route of the one or more end users 12 and if the end user transport directives allows for at least package delivery, then at least the package delivery obligation related to the delivery of the package can be fulfilled during transport of the one or more end users 12.

In the same or alternative implementations, operation 838 may include an operation 840 for verifying that all of the outstanding package delivery obligations of the transportation vehicle unit can be fulfilled even if the transportation vehicle unit transports the one or more end users in accordance with the one or more end user transport directives including verifying that one or more of the outstanding package delivery obligations for delivering one or more packages can be fulfilled before or after transport of the one or more end users by the transportation vehicle unit in accordance with the one or more end user transport directives. For instance, the fillable outstanding package delivery obligation confirming module 320 of the transport computing device 10* of FIG. 2A or 2B verifying that all of the outstanding package delivery obligations of the transportation vehicle unit 20 can be fulfilled even if the transportation vehicle unit 20 transports the one or more end users 12 in accordance with the one or more end user transport directives including verifying or confirming that one or more of the outstanding package delivery obligations for delivering one or more packages can be fulfilled (e.g., can be fulfilled based on the package delivery locations of one or more packages being transported by the transportation vehicle unit 20, the deadlines for delivering the one or more packages, and so forth) before or after transport of the one or more end users 12 by the transportation vehicle unit in accordance with the one or more end user transport directives.

In the same or alternative implementations, operation 838 may include an operation 841 for verifying that all of the outstanding package delivery obligations of the transportation vehicle unit can be fulfilled even if the transportation vehicle unit transports the one or more end users in accordance with the one or more end user transport directives including verifying that one or more spatial requirements for transporting the one or more end users in accordance with the one or more end user transport directives will not conflict with spatial requirements for transporting the one or more packages in accordance with one or more outstanding package delivery obligations of the transportation vehicle unit. For instance, the fillable outstanding package delivery obligation confirming module 320 including the spatial requirements non-conflict confirming module 322 (see FIG. 3C) of the transport computing device 10* of FIG. 2A or 2B verifying that all of the outstanding package delivery obligations of the transportation vehicle unit 20 can be fulfilled even if the transportation vehicle unit 20 transports the one or more end users 12 in accordance with the one or more end user transport directives including verifying or confirming, by the spatial requirements non-conflict confirming module 322, that one or more spatial requirements (e.g., passenger and/or luggage space requirements) for transporting the one or more end users 12 in accordance with the one or more end user transport directives will not conflict with spatial requirements for transporting the one or more packages in accordance with one or more outstanding package delivery obligations of the transportation vehicle unit 12.

In the same or alternative implementations, operation 838 may include an operation 842 for verifying that all of the outstanding package delivery obligations of the transportation vehicle unit can be fulfilled even if the transportation vehicle unit transports the one or more end users in accordance with the one or more end user transport directives including verifying that one or more end user preferences related to one or more passenger transport environment requirements as defined by the one or more end user transport directives will not conflict with one or more package transport environment requirements as defined by the one or more package delivery directives. For instance, the fillable outstanding package delivery obligation confirming module 320 including the environment preference non-conflict confirmation module 324 (see FIG. 3C) of the transport computing device 10* of FIG. 2A or 2B verifying that all of the outstanding package delivery obligations of the transportation vehicle unit 20 can be fulfilled even if the transportation vehicle unit transports the one or more end users 12 in accordance with the one or more end user transport directives including verifying or confirming, by the environment preference non-conflict confirmation module 324, that one or more end user preferences related to one or more passenger transport environment requirements (e.g., no-smoking vehicle, air-conditioning, no packages in the passenger cabin, etc.) as defined by the one or more end user transport directives will not conflict with one or more package transport environment requirements (e.g., no-smoking vehicle, no additional package/luggage on top of the packages during transport, etc.) as defined by the one or more package delivery directives.

In the same or alternative implementations, the non-conflict verifying operation 506 may include an operation 843 for verifying that the one or more end user transport directives do not conflict with the one or more package delivery directives including identifying one or more outstanding package delivery obligations of the transportation vehicle unit that can be fulfilled during transport of the one or more end user by the transportation vehicle unit without violating one or more passenger transport requirements as defined by the one or more end user transport directives as illustrated in FIG. 8C. For instance, the non-conflict confirming module 206* including the fillable outstanding package delivery obligation identifying module 324 (see FIG. 3C) of the transport computing device 10* of FIG. 2A or 2B verifying that the one or more end user transport directives do not conflict with the one or more package delivery directives including identifying, by the fillable outstanding package delivery obligation identifying module 324, one or more outstanding package delivery obligations of the transportation vehicle unit 20 that can be fulfilled (e.g., that can be fulfilled based on the package drop-off or delivery locations called for by the one or more package delivery obligations and relative to the transport route for transporting the one or more end users to one or more end user destination locations) during transport of the one or more end user 12 by the transportation vehicle unit 20 without violating one or more passenger transport requirements (e.g., drop-off deadlines, end user preference regarding limits on package deliveries, etc.) as defined by the one or more end user transport directives.

As further illustrated in FIG. 8C, in various implementations, operation 843 may further include one or more additional operations including, in some cases, an operation 844 for identifying one or more outstanding package delivery obligations of the transportation vehicle unit that can be fulfilled during transport of the one or more end user by identifying one or more outstanding package delivery obligations of the transportation vehicle unit that are yet to be fulfilled and that requires delivery of one or more packages to one or more package delivery locations that are determined as being along or proximate to a direct route for transporting, by the transportation vehicle unit, of the one or more end users from one or more rendezvous locations to one or more end user destination locations. For instance, the fillable outstanding package delivery obligation identifying module 324 of the transport computing device 10* of FIG. 2A or 2B identifying one or more outstanding package delivery obligations of the transportation vehicle unit 20 that can be fulfilled during transport of the one or more end user 12 by identifying one or more outstanding package delivery obligations of the transportation vehicle unit that are yet to be fulfilled (e.g., the one or more packages that are required to be delivered by the one or more package delivery directives have not yet been delivered) and that requires delivery of one or more packages to one or more package delivery locations that are determined as being along or proximate (e.g., within one mile) to a direct route (e.g., shortest distance route or time efficient route) for transporting, by the transportation vehicle unit 20, of the one or more end users 12 from one or more rendezvous locations to one or more end user destination locations.

In the same or alternative implementations, operation 843 may include an operation 845 for identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences related to transporting of the one or more end users as defined by the one or more end user transport directives. For instance, the fillable outstanding package delivery obligation identifying module 324 of the transport computing device 10* of FIG. 2A or 2B identifying the one or more outstanding package delivery obligations of the transportation vehicle unit 20 that can be fulfilled during transport of the one or more end user 12 by the transportation vehicle unit 20, the identification being based, at least in part, on a determination that fulfilling the one or more outstanding package delivery obligations (e.g., determination that successfully delivering one or more package in full compliance with the one or more package obligations) during transport of the one or more end users 12 by the transportation vehicle unit 20 will not conflict with one or more end user preferences (e.g., no package delivery allowed if there is more than 15 minutes delay in transporting the one or more end users 12 to their destination location) related to transporting of the one or more end users 12 as defined by the one or more end user transport directives.

As further illustrated in FIG. 8C, in various implementations, operation 845 may further include one or more additional operations including, in some cases, an operation 846 for identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences related to package deliveries during transport of the one or more end users. For instance, the fillable outstanding package delivery obligation identifying module 324 of the transport computing device 10* of FIG. 2A or 2B identifying the one or more outstanding package delivery obligations of the transportation vehicle unit 20 that can be fulfilled during transport of the one or more end user 12 by the transportation vehicle unit 12, the identification being based, at least in part, on a determination that fulfilling the one or more outstanding package delivery obligations (e.g., obligation to deliver one package to one package delivery location) during transport of the one or more end users 12 by the transportation vehicle unit 20 will not conflict with (e.g., do not violate) one or more end user preferences (e.g., no more than one package delivery permitted during transport of the one or more end users 12) related to package deliveries during transport of the one or more end users 12.

In some implementations, operation 846 may actually involve an operation 847 for identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences that no more than a predefined maximum number of package delivery or deliveries are permitted to be executed during transport of the one or more end users. For instance, the fillable outstanding package delivery obligation identifying module 324 of the transport computing device 10*  of FIG. 2A or 2B identifying the one or more outstanding package delivery obligations of the transportation vehicle unit 20 that can be fulfilled during transport of the one or more end user 12 by the transportation vehicle unit 20, the identification being based, at least in part, on a determination that fulfilling the one or more outstanding package delivery obligations during transport of the one or more end users 12 by the transportation vehicle unit 20 will not conflict with one or more end user preferences that no more than a predefined maximum number of package delivery or deliveries are permitted to be executed during transport of the one or more end users 12. For example, if there are multiple outstanding package delivery obligations that can be fulfilled during transport of the one or more end users 12 but if there is an end user preference that only one package delivery permitted during transport of the one or more end users 12 then only one of the outstanding package delivery obligations may actually be fulfilled. The selection of which of the package delivery obligations is selected for fulfillment may be based on a number of factors including, based on the priority of the packages to be delivered, the deadlines for delivering packages, and so forth.

In the same or alternative implementations, operation 846 may include an operation 848 for identifying the one or more outstanding package delivery obligations of the transportation vehicle unit that can be fulfilled during transport of the one or more end user by the transportation vehicle unit based, at least in part, on a determination that fulfilling the one or more outstanding package delivery obligations during transport of the one or more end users by the transportation vehicle unit will not conflict with one or more end user preferences that no more than a predefined maximum amount of time delay is permitted for transporting the one or more end users and as a result of delivering one or more packages during transport of the one or more end users. For instance, the fillable outstanding package delivery obligation identifying module 324 of the transport computing device 10*  of FIG. 2A or 2B identifying the one or more outstanding package delivery obligations of the transportation vehicle unit 20 that can be fulfilled during transport of the one or more end user 12 by the transportation vehicle unit 20, the identification being based, at least in part, on a determination that fulfilling the one or more outstanding package delivery obligations during transport of the one or more end users 12 by the transportation vehicle unit 20 will not conflict with one or more end user preferences that no more than a predefined maximum amount of time delay (e.g., 20 minutes delay) is permitted for transporting the one or more end users 12 and as a result of delivering one or more packages during transport of the one or more end users 12. For example, identifying only those outstanding package delivery obligations that when fulfilled will not add more than 15 minutes delay time to the overall time it takes to transport the one or more end users 12 to their end user destination location and that is permitted under an end user preference that no more than 25 minutes of delay is allowed for delivering packages.

Figure 8D:
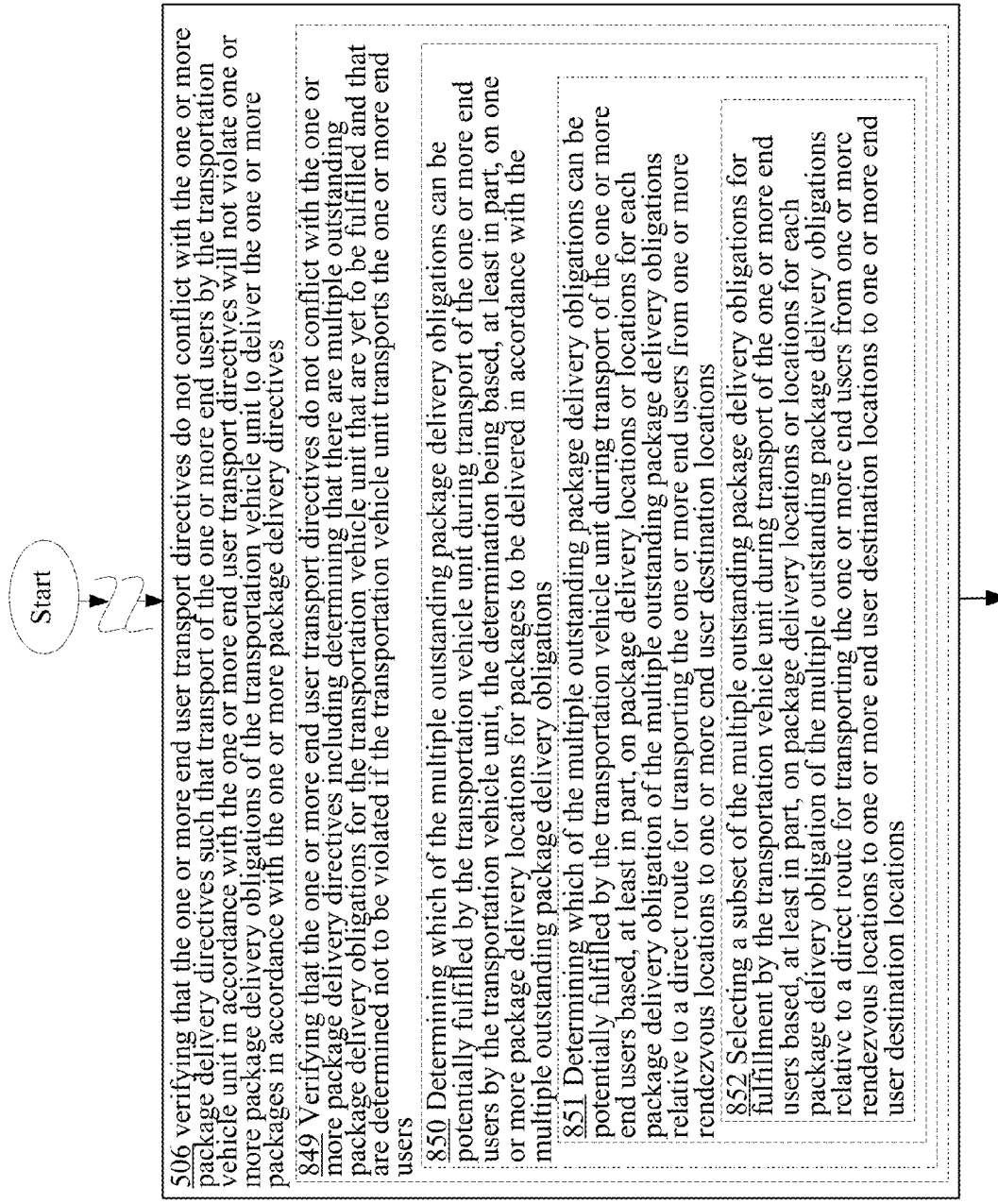
FIG. 8D is a high-level logic flowchart of a process depicting alternate implementations of the non-conflict verifying operation 506 of FIG. 5.

Referring now to FIG. 8D, in various implementations, the non-conflict verifying operation 506 may include an operation 849 for verifying that the one or more end user transport directives do not conflict with the one or more package delivery directives including determining that there are multiple outstanding package delivery obligations for the transportation vehicle unit that are yet to be fulfilled and that are determined not to be violated if the transportation vehicle unit transports the one or more end users. For instance, the non-conflict confirming module 206*  including the outstanding package delivery obligation determining module 326 (see FIG. 3C) of the transport computing device 10*  of FIG. 2A or 2B verifying or confirming that the one or more end user transport directives do not conflict with the one or more package delivery directives including determining, by the outstanding package delivery obligation determining module 326, that there are multiple outstanding package delivery obligations for the transportation vehicle unit 20 that are yet to be fulfilled and that are determined not to be violated if the transportation vehicle unit transports the one or more end users 12.

In some implementations, operation 849 may further include an operation 850 for determining which of the multiple outstanding package delivery obligations can be potentially fulfilled by the transportation vehicle unit during transport of the one or more end users by the transportation vehicle unit, the determination being based, at least in part, on one or more package delivery locations for packages to be delivered in accordance with the multiple outstanding package delivery obligations. For instance, the fillable outstanding package delivery obligation determining module 328 (see FIG. 3C) of the transport computing device 10*  of FIG. 2A or 2B determining which of the multiple outstanding package delivery obligations can be potentially fulfilled by the transportation vehicle unit 20 during transport of the one or more end users 12 by the transportation vehicle unit 20, the determination being based, at least in part, on one or more package delivery locations for packages to be delivered in accordance with the multiple outstanding package delivery obligations.

As further illustrated in FIG. 8D, in some implementations, operation 850 may further include an operation 851 for determining which of the multiple outstanding package delivery obligations can be potentially fulfilled by the transportation vehicle unit during transport of the one or more end users based, at least in part, on package delivery locations or locations for each package delivery obligation of the multiple outstanding package delivery obligations relative to a direct route for transporting the one or more end users from one or more rendezvous locations to one or more end user destination locations. For instance, the fillable outstanding package delivery obligation determining module 328 of the transport computing device 10*  of FIG. 2A or 2B determining which of the multiple outstanding package delivery obligations can be potentially fulfilled by the transportation vehicle unit 20 during transport of the one or more end users 12, the determination being based, at least in part, on package delivery locations or locations associated with each of the package delivery obligations of the multiple outstanding package delivery obligations relative to a direct route (e.g., shortest route or most time efficient route) for transporting the one or more end users 12 from one or more rendezvous locations to one or more end user destination locations.

In some cases, operation 851 may further include an operation 852 for selecting a subset of the multiple outstanding package delivery obligations for fulfillment by the transportation vehicle unit during transport of the one or more end users based, at least in part, on package delivery locations or locations for each package delivery obligation of the multiple outstanding package delivery obligations relative to a direct route for transporting the one or more end users from one or more rendezvous locations to one or more end user destination locations. For instance, the outstanding package delivery obligation fulfillment selecting module 330 (see FIG. 3C) of the transport computing device 10* of FIG. 2A or 2B selecting a subset of the multiple outstanding package delivery obligations for fulfillment by the transportation vehicle unit 20 during transport of the one or more end users 12, the selection being based, at least in part, on package delivery locations or locations for each package delivery obligation of the multiple outstanding package delivery obligations relative to a direct route (e.g., shortest route or most time efficient route) for transporting the one or more end users 12 from one or more rendezvous locations to one or more end user destination locations.

Figure 8E:
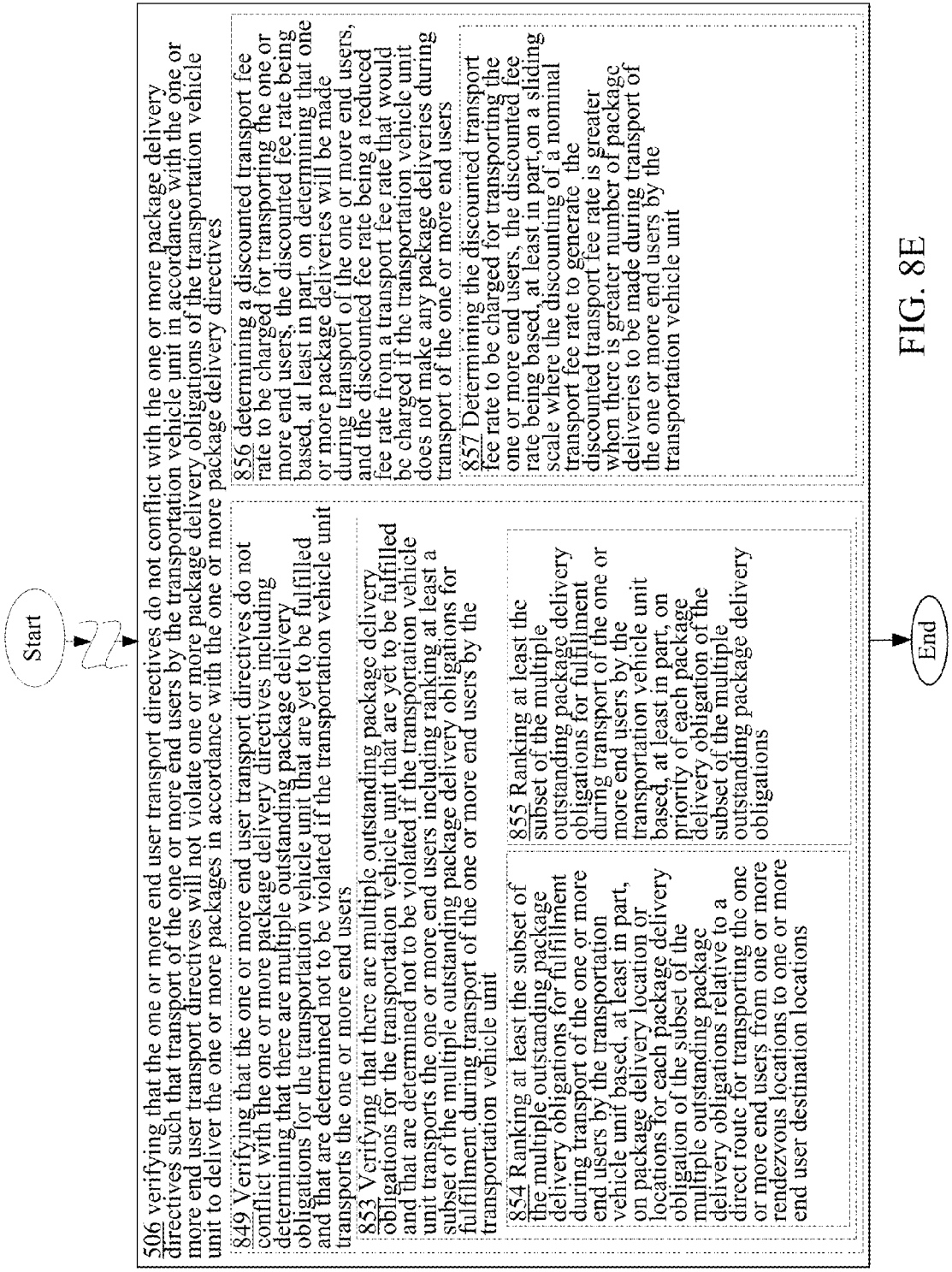
FIG. 8E is a high-level logic flowchart of a process depicting alternate implementations of the non-conflict verifying operation 506 of FIG. 5.

Turning to FIG. 8E, in the same or alternative implementations, operation 849 may include an operation 853 for verifying that there are multiple outstanding package delivery obligations for the transportation vehicle unit that are yet to be fulfilled and that are determined not to be violated if the transportation vehicle unit transports the one or more end users including ranking at least a subset of the multiple outstanding package delivery obligations for fulfillment during transport of the one or more end users by the transportation vehicle unit. For instance, the non-conflict confirming module 206* including the outstanding package delivery obligation ranking module 332 (see FIG. 3C) of the transport computing device 10* of FIG. 2A or 2B verifying that there are multiple outstanding package delivery obligations for the transportation vehicle unit that are yet to be fulfilled and that are determined not to be violated if the transportation vehicle unit 20 transports the one or more end users 12 including ranking, by the outstanding package delivery obligation ranking module 332, at least a subset of the multiple outstanding package delivery obligations for fulfillment during transport of the one or more end users 12 by the transportation vehicle unit 20.

In some implementations, operation 853 may further include an operation 854 for ranking at least the subset of the multiple outstanding package delivery obligations for fulfillment during transport of the one or more end users by the transportation vehicle unit based, at least in part, on package delivery location or locations for each package delivery obligation of the subset of the multiple outstanding package delivery obligations relative to a direct route for transporting the one or more end users from one or more rendezvous locations to one or more end user destination locations. For instance, the outstanding package delivery obligation ranking module 332 of the transport computing device 10* of FIG. 2A or 2B ranking at least the subset of the multiple outstanding package delivery obligations for fulfillment during transport of the one or more end users 12 by the transportation vehicle unit 20 based, at least in part, on package delivery location or locations for each package delivery obligation of the subset of the multiple outstanding package delivery obligations relative to a direct route for transporting the one or more end users 12 from one or more rendezvous locations to one or more end user destination locations. For example, ranking higher those outstanding package delivery obligations that require delivery of packages to package delivery locations that are relatively near to a direct route for transporting the one or more end users 12 than those outstanding package delivery obligations that require delivery of packages to package delivery locations that are relatively far away from the direct route.

In the same or different implementations, operation 853 may include an operation 855 for ranking at least the subset of the multiple outstanding package delivery obligations for fulfillment during transport of the one or more end users by the transportation vehicle unit based, at least in part, on priority of each package delivery obligation of the subset of the multiple outstanding package delivery obligations. For instance, the outstanding package delivery obligation ranking module 332 of the transport computing device 10* of FIG. 2A or 2B ranking at least the subset of the multiple outstanding package delivery obligations for fulfillment during transport of the one or more end users 12 by the transportation vehicle unit 20 based, at least in part, on priority (e.g., earlier drop-off deadlines as opposed to later drop-off deadlines, priority mail as opposed to first class mail, and so forth) of each package delivery obligation of the subset of the multiple outstanding package delivery obligations.

In some implementations, the non-conflict verifying operation 506 may include an operation 856 for determining a discounted transport fee rate to be charged for transporting the one or more end users, the discounted fee rate being based, at least in part, on determining that one or more package deliveries will be made during transport of the one or more end users, and the discounted fee rate being a reduced fee rate from a transport fee rate that would be charged if the transportation vehicle unit does not make any package deliveries during transport of the one or more end users. For instance, the discount transportation fee rate determining module 334 of the transport computing device 10* of FIG. 2A or 2B determining a discounted transport fee rate to be charged for transporting the one or more end users 12, the discounted fee rate being based, at least in part, on determining that one or more package deliveries will be made during transport of the one or more end users 12, and the discounted fee rate being a reduced fee rate from a nominal transport fee rate that would be charged if the transportation vehicle unit 20 does not make any package deliveries during transport of the one or more end users 12.

In some cases, operation 856 may further include an operation 857 for determining the discounted transport fee rate to be charged for transporting the one or more end users, the discounted fee rate being based, at least in part, on a sliding scale where the discounting of a nominal transport fee rate to generate the discounted transport fee rate is greater when there is greater number of package deliveries to be made during transport of the one or more end users by the transportation vehicle unit. For instance, the discount transportation fee rate determining module 334 of the transport computing device 10* of FIG. 2A or 2B determining the discounted transport fee rate to be charged for transporting the one or more end users 12, the discounted fee rate being based, at least in part, on a sliding scale where the discounting of a nominal transport fee rate to generate the discounted transport fee rate is greater when there is greater number of package deliveries to be made during transport of the one or more end users 12 by the transportation vehicle unit 20. For example, the discounting of the nominal transport fee rate may be 10 percent if only one package delivery is made during transport of the one or more end users 12, the discounting of the nominal transport fee rate may be 20 percent if two package deliveries are made during transport of the one or more end users 12, and so forth.

Figure 9:
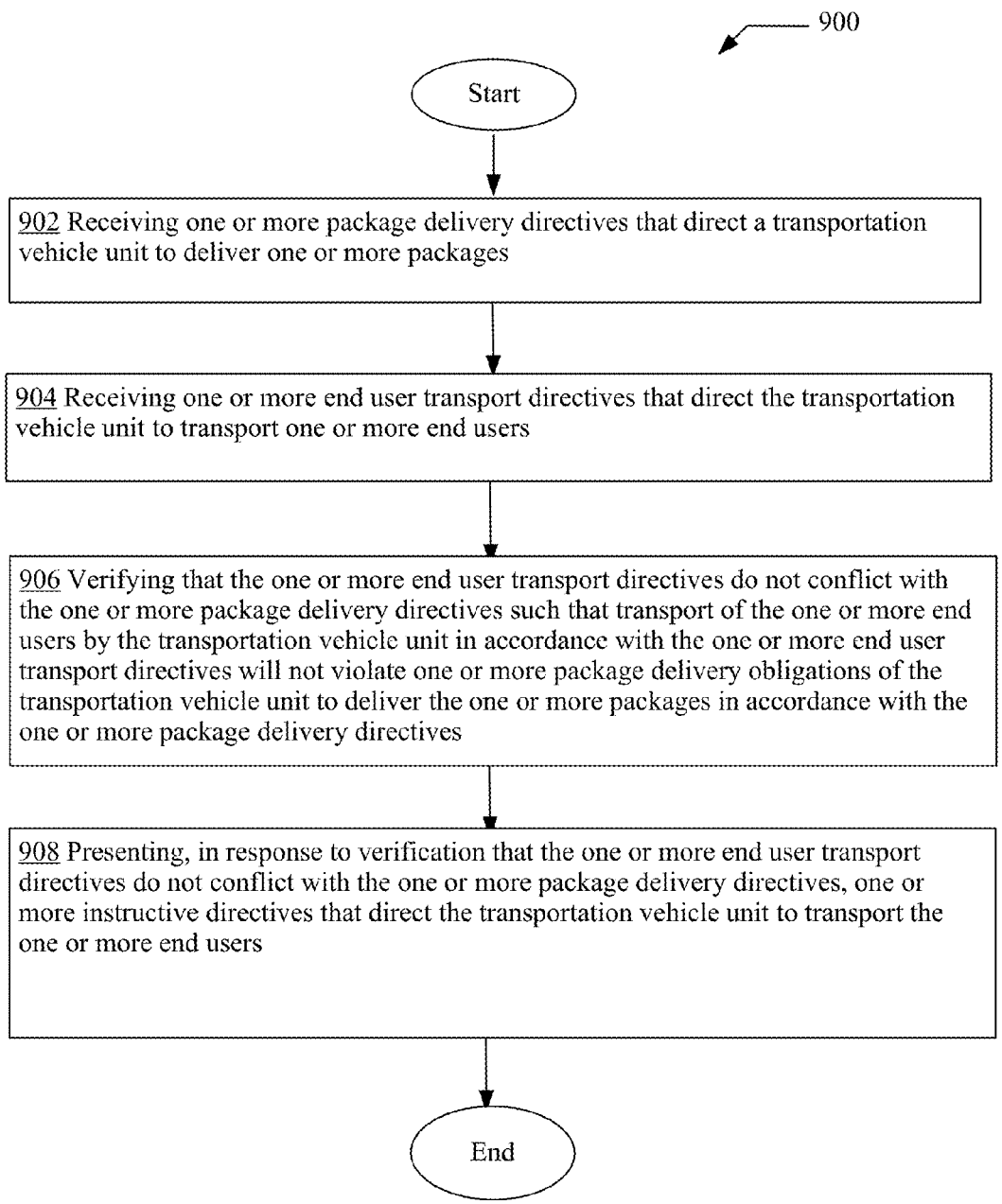
FIG. 9 is a high-level logic flowchart of another process, e.g., operational flow 900, according to some embodiments.

Turning now to FIG. 9 illustrating another operational flow 900. Operational flow 900 includes certain operations that mirror the operations included in operational flow 500 of FIG. 5. These operations include a package delivery directive receiving operation 902, a transport directive receiving operation 904, and a non-conflict verifying operation 906 that corresponds to and mirrors the package delivery directive receiving operation 502, the transport directive receiving operation 504, and non-conflict verifying operation 506, respectively, of FIG. 5.

In addition, operational flow 900 further includes an instructive directive presenting operation 908 for presenting, in response to verification that the one or more end user transport directives do not conflict with the one or more package delivery directives, one or more instructive directives that direct the transportation vehicle unit to transport the one or more end users. For instance, the instructive directive presenting module 208* of the transport computing device 10* of FIG. 2A or 2B presenting, in response to verification that the one or more end user transport directives do not conflict with the one or more package delivery directives, one or more instructive directives that direct the transportation vehicle unit 20 to transport the one or more end users 12. In various embodiments, the one or more instructive directives may provide certain information needed for transporting the one or more end users 12 including, for example, data that identifies the one or more end users 12, the pick-up point (e.g., rendezvous location) for securing the one or more end users 12, destination location or locations, and so forth.

Figure 10A:
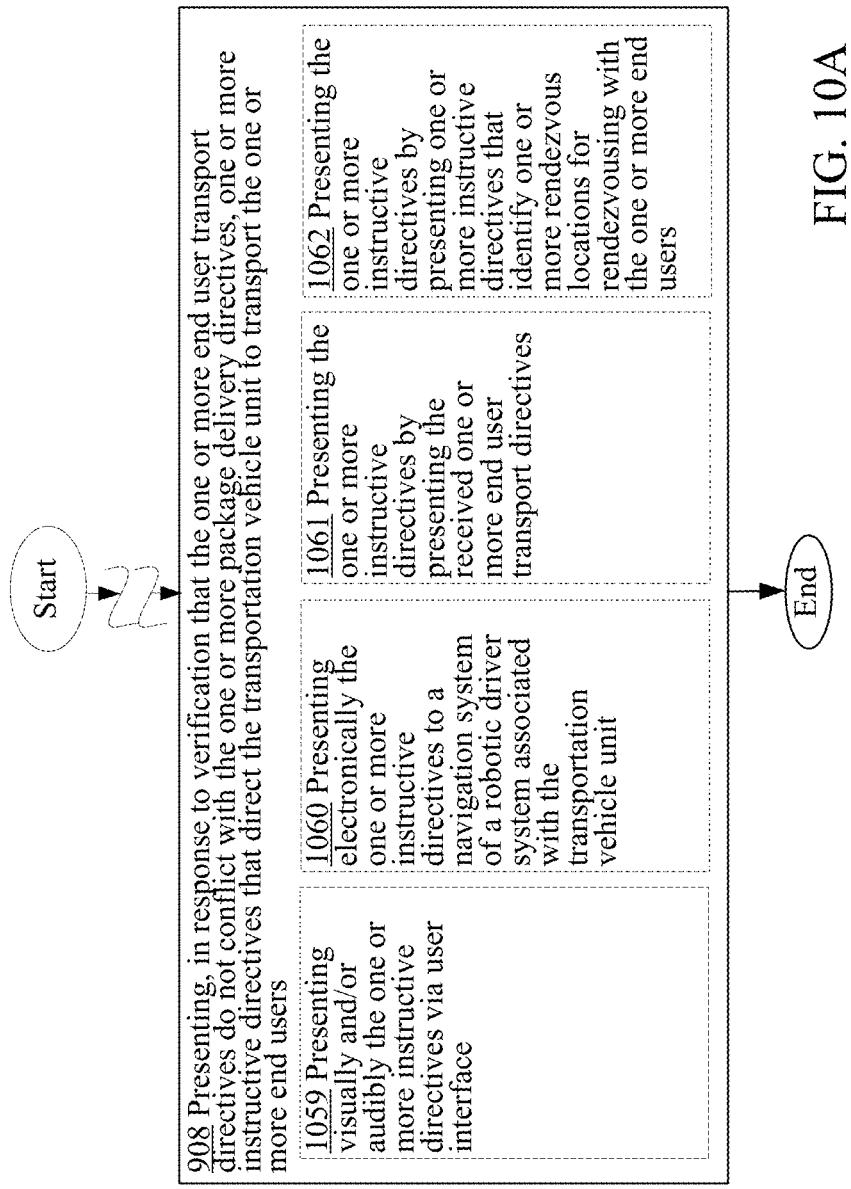
FIG. 10A is a high-level logic flowchart of a process depicting alternate implementations of the instructive directive presenting operation 908 of FIG. 9.
Figure 10B:
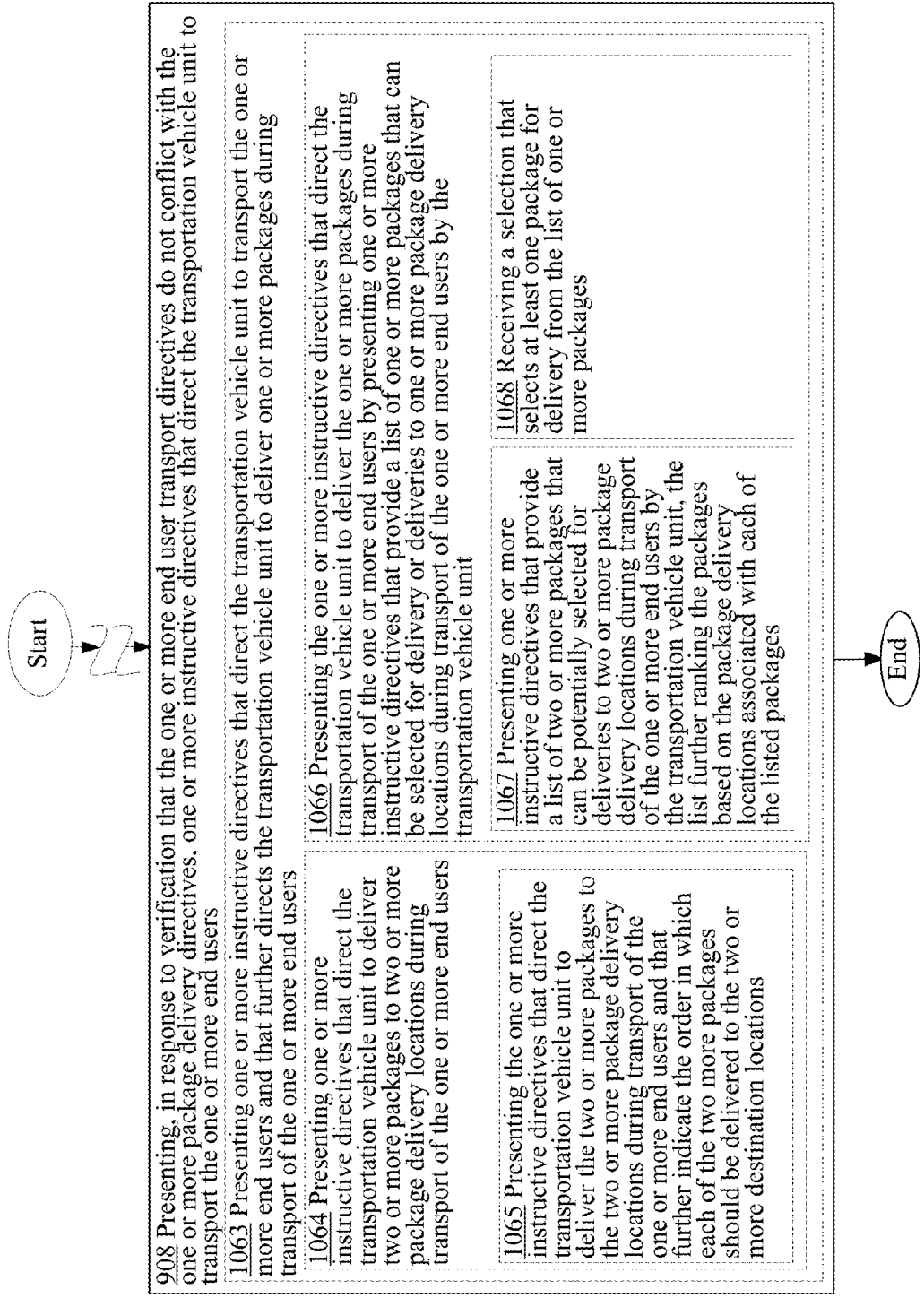
FIG. 10B is a high-level logic flowchart of a process depicting alternate implementations of the instructive directive presenting operation 908 of FIG. 9.
Figure 10C:
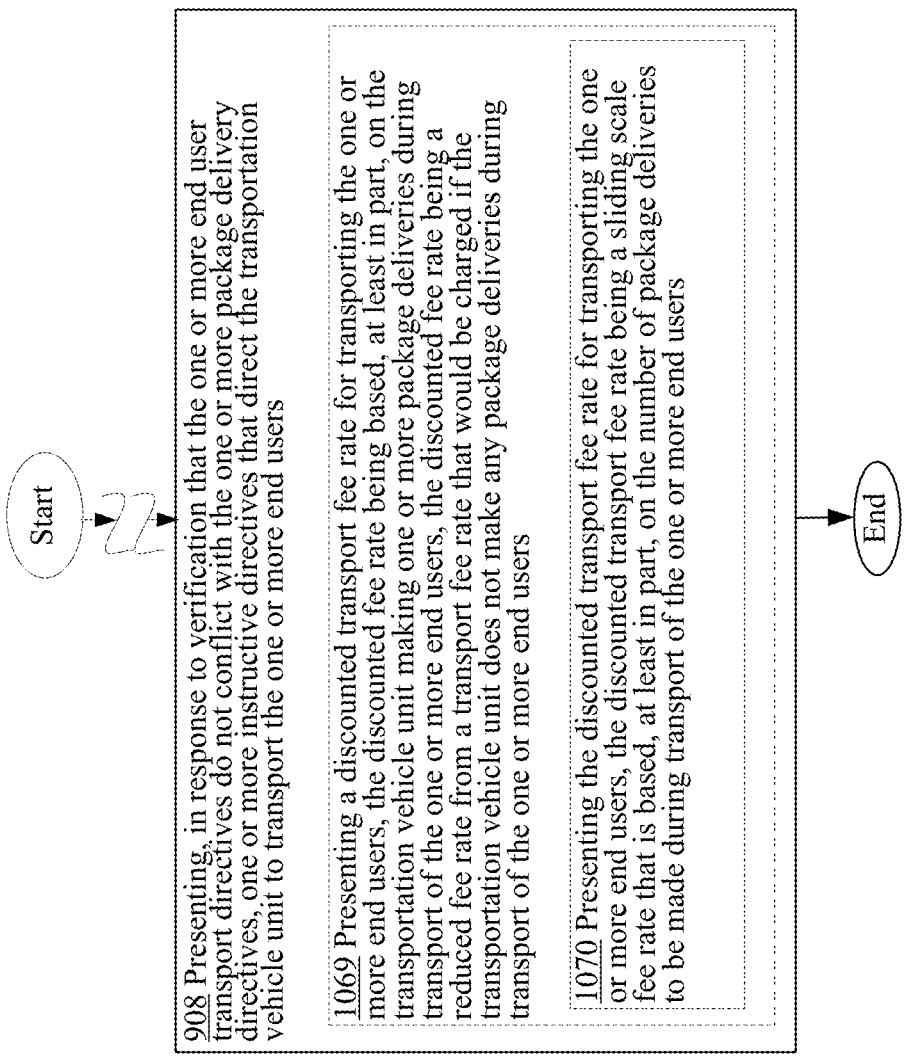
FIG. 10C is a high-level logic flowchart of a process depicting alternate implementations of the instructive directive presenting operation 908 of FIG. 9.

As further illustrated in FIGS. 10A, 10B, and 10C, the instructive directive presenting operation 908 may be implemented in a variety of different ways in various alternative implementations. For example, in some implementations, the instructive directive presenting operation 908 may include an operation 1059 for presenting visually and/or audibly the one or more instructive directives via user interface as illustrated in FIG. 10A. For instance, the visual/audible presenting module 336 (see FIG. 3D) of the transport computing device 10* of FIG. 2A or 2B presenting visually and/or audibly the one or more instructive directives via user interface 250 (e.g., touchscreen, speakers, and so forth).

In the same or alternative implementations, the instructive directive presenting operation 908 may include an operation 1060 for presenting electronically the one or more instructive directives to a navigation system of a robotic driver system associated with the transportation vehicle unit. For instance, the electronic directive presenting module 338 (see FIG. 3D) of the transport computing device 10* of FIG. 2A or 2B presenting electronically the one or more instructive directives to a navigation system 452 of a robotic driver system 450 associated with the transportation vehicle unit 20.

In the same or alternative implementations, the instructive directive presenting operation 908 may include an operation 1061 for presenting the one or more instructive directives by presenting the received one or more end user transport directives. For instance, the instructive directive presenting module 208* of the transport computing device 10* of FIG. 2A or 2B presenting the one or more instructive directives by presenting the received one or more end user transport directives. Note that in alternative implementations, the one or more instructive directives to be presented may actually be different from the one or more received end user transport directives.

In the same or alternative implementations, the instructive directive presenting operation 908 may include an operation 1062 for presenting the one or more instructive directives by presenting one or more instructive directives that identify one or more rendezvous locations for rendezvousing with the one or more end users. For instance, the instructive directive presenting module 208* of the transport computing device 10* of FIG. 2A or 2B presenting the one or more instructive directives by presenting one or more instructive directives that identify one or more rendezvous locations where the transportation vehicle unit 20 can rendezvous with the one or more end users 12.

In In the same or alternative implementations, the instructive directive presenting operation 908 may include an operation 1063 for presenting one or more instructive directives that direct the transportation vehicle unit to transport the one or more end users and that further directs the transportation vehicle unit to deliver one or more packages during transport of the one or more end users as illustrated in FIG. 10B. For instance, the instructive directive presenting module 208* of the transport computing device 10* of FIG. 2A or 2B presenting one or more instructive directives that direct the transportation vehicle unit 20 to transport the one or more end users 12 and that further directs the transportation vehicle unit to deliver one or more packages during transport of the one or more end users 12.

As further illustrated in FIG. 10B, in various implementations, operation 1063 may include one or more additional operations including, in some cases, an operation 1064 for presenting one or more instructive directives that direct the transportation vehicle unit to deliver two or more packages to two or more package delivery locations during transport of the one or more end users. For instance, the instructive directive presenting module 208* of the transport computing device 10* of FIG. 2A or 2B presenting one or more instructive directives that direct the transportation vehicle unit 20 to deliver two or more packages to two or more package delivery locations during transport of the one or more end users 12.

In some implementations, operation 1064 may further include an operation 1065 for presenting the one or more instructive directives that direct the transportation vehicle unit to deliver the two or more packages to the two or more package delivery locations during transport of the one or more end users and that further indicate the order in which each of the two more packages should be delivered to the two or more destination locations. For instance, the instructive directive presenting module 208* of the transport computing device 10* of FIG. 2A or 2B presenting the one or more instructive directives that direct the transportation vehicle unit 20 to deliver the two or more packages to the two or more package delivery locations during transport of the one or more end users 12 and that further indicate the order in which each of the two more packages should be delivered to the two or more destination locations.

In various implementations, operation 1063 may actually include an operation 1066 for presenting the one or more instructive directives that direct the transportation vehicle unit to deliver the one or more packages during transport of the one or more end users by presenting one or more instructive directives that provide a list of one or more packages that can be selected for delivery or deliveries to one or more package delivery locations during transport of the one or more end users by the transportation vehicle unit. For instance, the instructive directive presenting module 208* of the transport computing device 10* of FIG. 2A or 2B presenting the one or more instructive directives that direct the transportation vehicle unit 20 to deliver the one or more packages during transport of the one or more end users 12 by presenting one or more instructive directives that provide a list of one or more packages that can be selected (by a human driver or a robotic driver system) for delivery or deliveries to one or more package delivery locations during transport of the one or more end users 12 by the transportation vehicle unit 20. For example, a list such as the list of package delivery obligations illustrated in FIG. 3E may be presented.

In some implementations, operation 1066 may further include an operation 1067 for presenting one or more instructive directives that provide a list of two or more packages that can be potentially selected for deliveries to two or more package delivery locations during transport of the one or more end users by the transportation vehicle unit, the list further ranking the packages based on the package delivery locations associated with each of the listed packages. For instance, the instructive directive presenting module 208* of the transport computing device 10* of FIG. 2A or 2B presenting one or more instructive directives that provide a list of two or more packages that can be potentially selected for deliveries to two or more package delivery locations during transport of the one or more end users 12 by the transportation vehicle unit 20, the list further ranking the packages based on the package delivery locations associated with each of the listed packages. For example, those packages that are to be delivered to package delivery locations that are near the direct route for transporting the one or more end users 12 to one or more end user destination locations may be ranked higher than those packages that are to be delivered to package delivery locations further away from the direct route.

In the same or alternative implementations, operation 1066 may include an operation 1068 for receiving a selection that selects at least one package for delivery from the list of one or more packages. For instance, the package delivery selection receiving module 340 (see FIG. 3D) of the transport computing device 10* of FIG. 2A or 2B receiving a selection that selects at least one package for delivery from the list of one or more packages. In various embodiments, the selection that is received may be received from a human or robotic driver of the transportation vehicle unit 20.

Referring now to FIG. 10C, in various implementations, the instructive directive presenting operation 908 may include an operation 1069 for presenting a discounted transport fee rate for transporting the one or more end users, the discounted fee rate being based, at least in part, on the transportation vehicle unit making one or more package deliveries during transport of the one or more end users, the discounted fee rate being a reduced fee rate from a transport fee rate that would be charged if the transportation vehicle unit does not make any package deliveries during transport of the one or more end users. For instance, the discount transport fee rate presenting module 342 (see FIG. 3D) of the transport computing device 10* of FIG. 2A or 2B presenting a discounted transport fee rate for transporting the one or more end users 12, the discounted fee rate (e.g., may be a discounted flat fee rate, a discounted fee rate based on mileage and/or travel time, and so for) being based, at least in part, on the transportation vehicle unit 20 making one or more package deliveries during transport of the one or more end users 12, the discounted fee rate being a reduced fee rate from a nominal transport fee rate that would be charged if the transportation vehicle unit 20 does not make any package deliveries during transport of the one or more end users 12.

In some cases, operation 1069 may further include an operation 1070 for presenting the discounted transport fee rate for transporting the one or more end users, the discounted transport fee rate being a sliding scale fee rate that is based, at least in part, on the number of package deliveries to be made during transport of the one or more end users. For instance, the discount transport fee rate presenting module 342 of the transport computing device 10* of FIG. 2A or 2B presenting the discounted transport fee rate for transporting the one or more end users 12, the discounted transport fee rate being a sliding scale fee rate that is based, at least in part, on the number of package deliveries to be made by the transportation vehicle unit 20 during transport of the one or more end users 12.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
    circuitry for receiving end user preference data indicating one or more preferences of an end user related to package deliveries to occur during transport of the end user;
    circuitry for receiving one or more end user transport requests, at least partly via at least one end user device associated with an end user, that request a transportation vehicle unit to transport the end user; and
    circuitry for confirming that transport of the end user by the transportation vehicle unit in accordance with the end user transport request will not violate one or more package delivery obligations of the transportation vehicle unit or one or more preferences of the end user related to package deliveries during transport of the end user;
    circuitry for electronically transmitting navigation instructions to a navigation system associated with the transportation vehicle unit directing the transportation vehicle unit to rendezvous with the end user responsive to the confirming.

2. The system of claim 1, wherein said circuitry for receiving one or more end user transport requests, at least partly via at least one end user device associated with an end user, that request a transportation vehicle unit to transport the end user comprises:
    circuitry for receiving one or more end user transport requests that identify one or more deadlines for arriving at one or more destination locations for the end user.

3. The system of claim 1, end user end user further comprising:
    circuitry for receiving one or more package delivery requests that identify at least one package for delivery by the transportation vehicle unit during transport of the end user.

4. The system of claim 3, wherein said circuitry for receiving one or more package delivery requests that identify at least one package for delivery by the transportation vehicle unit during transport of the end user comprises:
    circuitry for receiving one or more package delivery requests that identify end user end user an order in which two or more packages are to be delivered to two or more package delivery locations.

5. The system of claim 3, wherein said circuitry for receiving one or more package delivery requests that identify at least one package for delivery by the transportation vehicle unit during transport of the end user comprises:
    circuitry for receiving one or more package delivery requests that identify at least one route for delivering the at least one package by the transportation vehicle unit during transport of the end user.

6. The system of claim 1, wherein said circuitry for receiving one or more end user transport requests, at least partly via at least one end user device associated with an end user, that request a transportation vehicle unit to transport the end user comprises:
    circuitry for receiving one or more end user transport requests that request the transportation vehicle unit to transport end user following at least one package delivery by the transportation vehicle unit end user.

7. The system of claim 1, wherein said circuitry for receiving one or more end user transport requests, at least partly via at least one end user device associated with an end user, that request a transportation vehicle unit to transport the end user comprises:
  circuitry for receiving one or more end user transport requests that direct the transportation vehicle unit to transport end user prior to at least one package delivery by the transportation vehicle unit end user end user.

8. The system of claim 1, wherein said circuitry for receiving end user preference data indicating one or more preferences of the end user related to package deliveries to occur during transport of the end user comprises:
  circuitry for receiving end user preference data indicating a preference that no packages be delivered during transport of the end user.

9. The system of claim 1, wherein said circuitry for receiving end user preference data indicating one or more preferences of the end user related to package deliveries to occur during transport of the end user comprises:
  circuitry for receiving end user preference data indicating a preference that no more than a predefined maximum number of package deliveries are permitted to be executed during transport of the end user.

10. The system of claim 1, wherein said circuitry for receiving end user preference data indicating one or more preferences of the end user related to package deliveries to occur during transport of the end user comprises:
  circuitry for receiving end user preference data indicating a preference that no more than a predefined maximum amount of time delay is permitted for transporting of the end user as a result of delivering the one or more packages during transport of the end user.

11. The system of claim 1, wherein said circuitry for receiving one or more end user transport requests, at least partly via at least one end user device associated with an end user, that request a transportation vehicle unit to transport the end user comprises:
  circuitry for receiving discount transport rate data indicating a discounted transport fee rate for transporting the end user based, at least in part, on the transportation vehicle unit making one or more package deliveries during transport of the end user.

12. The system of claim 1, wherein said circuitry for confirming that transport of the end user by the transportation vehicle unit in accordance with the end user transport request will not violate one or more package delivery obligations of the transportation vehicle unit comprises:
  circuitry for confirming that there is no outstanding package delivery obligation that obligates the transportation vehicle unit to deliver one or more packages during a projected time span needed for transporting the end user by the transportation vehicle unit to one or more end user destination locations.

13. The system of claim 1, wherein said circuitry for confirming that transport of the end user by the transportation vehicle unit in accordance with the end user transport request will not violate one or more package delivery obligations of the transportation vehicle unit comprises:
  circuitry for confirming that there is no outstanding package delivery obligation that obligates the transportation vehicle unit to deliver one or more packages by one or more deadlines that would be violated if the end user is transported by the transportation vehicle unit.

14. The system of claim 1, wherein said circuitry for confirming that transport of the end user by the transportation vehicle unit in accordance with the end user transport request will not violate one or more package delivery obligations of the transportation vehicle unit comprises:
  circuitry for confirming that there is no outstanding package delivery obligation that obligates the transportation vehicle unit to deliver one or more packages in one or more specified environmental conditions that would be violated if the end user is transported by the transportation vehicle unit.

15. The system of claim 1, wherein said circuitry for confirming that transport of the end user by the transportation vehicle unit in accordance with the end user transport request will not violate one or more package delivery obligations of the transportation vehicle unit comprises:
  circuitry for confirming that all outstanding package delivery obligations of the transportation vehicle unit can be fulfilled even if the transportation vehicle unit transports the end users in accordance with the one or more end user transport requests.

16. The system of claim 15, wherein said circuitry for confirming that all outstanding package delivery obligations of the transportation vehicle unit can be fulfilled even if the transportation vehicle unit transports the end users in accordance with the one or more end user transport requests comprises:
  circuitry for confirming that one or more of the outstanding package delivery obligations for delivering one or more packages can be fulfilled during transport of the end user by the transportation vehicle unit in accordance with the one or more end user transport requests.

17. The system of claim 15, wherein said circuitry for confirming that all outstanding package delivery obligations of the transportation vehicle unit can be fulfilled even if the transportation vehicle unit transports the end users in accordance with the one or more end user transport requests comprises:
  circuitry for confirming that one or more of the outstanding package delivery obligations for delivering one or more packages can be fulfilled before or after transport of the end user by the transportation vehicle unit in accordance with the one or more end user transport requests.

18. The system of claim 15, wherein said circuitry for confirming that all outstanding package delivery obligations of the transportation vehicle unit can be fulfilled even if the transportation vehicle unit transports the end users in accordance with the one or more end user transport requests comprises:
  circuitry for confirming that one or more spatial requirements for transporting the end user in accordance with the one or more end user transport requests will not conflict with spatial requirements for transporting the one or more packages in accordance with one or more outstanding package delivery obligations of the transportation vehicle unit.

19. The system of claim 15, wherein said circuitry for confirming that all outstanding package delivery obligations of the transportation vehicle unit can be fulfilled even if the transportation vehicle unit transports the end users in accordance with the one or more end user transport requests comprises:
  circuitry for confirming that one or more end user preferences related to one or more passenger transport environment requirements as defined by the one or more end user transport requests will not conflict with one or more package transport environment requirements as defined by the one or more package delivery requests.

20. The system of claim 1, wherein said circuitry for confirming that transport of the end user by the transportation vehicle unit in accordance with the end user transport request will not violate one or more package delivery obligations of the transportation vehicle unit comprises:

circuitry for identifying one or more outstanding package delivery obligations of the transportation vehicle unit that can be fulfilled during transport of the end user by the transportation vehicle unit without violating one or more passenger transport requirements as defined by the one or more end user transport requests.

21. The system of claim 20, wherein said circuitry for identifying one or more outstanding package delivery obligations of the transportation vehicle unit that can be fulfilled during transport of the end user by the transportation vehicle unit without violating one or more passenger transport requirements as defined by the one or more end user transport requests comprises:

circuitry for identifying one or more outstanding package delivery obligations of the transportation vehicle unit that are yet to be fulfilled and that requires delivery of one or more packages to one or more package delivery locations that are determined as being along or proximate to a direct route for transporting, by the transportation vehicle unit, the end user from one or more rendezvous locations to one or more end user destination locations.

22. The system of claim 20, wherein said circuitry for identifying one or more outstanding package delivery obligations of the transportation vehicle unit that can be fulfilled during transport of the end user by the transportation vehicle unit without violating one or more passenger transport requirements as defined by the one or more end user transport requests comprises:

circuitry for determining that fulfilling the one or more outstanding package delivery obligations during transport of the end users by the transportation vehicle unit will not conflict with one or more end user preferences related to transporting of the end user as defined by the one or more end user transport requests.

23. The system of claim 22, wherein said circuitry for determining that fulfilling the one or more outstanding package delivery obligations during transport of the end users by the transportation vehicle unit will not conflict with one or more end user preferences related to transporting of the end user as defined by the one or more end user transport requests comprises:

circuitry for determining that fulfilling the one or more outstanding package delivery obligations during transport of the end user by the transportation vehicle unit will not conflict with one or more end user preferences related to package deliveries during transport of the end user.

24. The system of claim 23, wherein said circuitry for determining that fulfilling the one or more outstanding package delivery obligations during transport of the end user by the transportation vehicle unit will not conflict with one or more end user preferences related to package deliveries during transport of the end user comprises:

circuitry for determining that fulfilling the one or more outstanding package delivery obligations during transport of the end user by the transportation vehicle unit will not conflict with one or more end user preferences that no more than a predefined maximum number of package delivery or deliveries are permitted to be executed during transport of the end user.

25. The system of claim 23, wherein said circuitry for determining that fulfilling the one or more outstanding package delivery obligations during transport of the end user by the transportation vehicle unit will not conflict with one or more end user preferences related to package deliveries during transport of the end user comprises:

circuitry for determining that fulfilling the one or more outstanding package delivery obligations during transport of the end user by the transportation vehicle unit will not conflict with one or more end user preferences that no more than a predefined maximum amount of time delay is permitted for transporting the end user and as a result of delivering one or more packages during transport of the end user.

26. The system of claim 1, wherein said circuitry for confirming that transport of the end user by the transportation vehicle unit in accordance with the end user transport request will not violate one or more package delivery obligations of the transportation vehicle unit comprises:

circuitry for determining that there are multiple outstanding package delivery obligations for the transportation vehicle unit that are yet to be fulfilled and that are determined not to be violated if the transportation vehicle unit transports the end user.

27. The system of claim 26, wherein said circuitry for determining that there are multiple outstanding package delivery obligations for the transportation vehicle unit that are yet to be fulfilled and that are determined not to be violated if the transportation vehicle unit transports the end user comprises:

circuitry for determining which of the multiple outstanding package delivery obligations can be potentially fulfilled by the transportation vehicle unit during transport of the end user by the transportation vehicle unit, the determination being based, at least in part, on one or more package delivery locations for packages to be delivered in accordance with the multiple outstanding package delivery obligations.

28. The system of claim 27, wherein said circuitry for determining which of the multiple outstanding package delivery obligations can be potentially fulfilled by the transportation vehicle unit during transport of the end user by the transportation vehicle unit, the determination being based, at least in part, on one or more package delivery locations for packages to be delivered in accordance with the multiple outstanding package delivery obligations comprises:

circuitry for determining which of the multiple outstanding package delivery obligations can be potentially fulfilled by the transportation vehicle unit during transport of the end user based, at least in part, on package delivery locations or locations for each package delivery obligation of the multiple outstanding package delivery obligations relative to a direct route for transporting the end user from one or more rendezvous locations to one or more end user destination locations.

29. The system of claim 28, wherein said circuitry for determining which of the multiple outstanding package delivery obligations can be potentially fulfilled by the transportation vehicle unit during transport of the end user based, at least in part, on package delivery locations or locations for each package delivery obligation of the multiple outstanding package delivery obligations relative to a direct route for transporting the end user from one or more rendezvous locations to one or more end user destination locations comprises:

circuitry for selecting a subset of the multiple outstanding package delivery obligations for fulfillment by the transportation vehicle unit during transport of the end user based, at least in part, on package delivery locations or locations for each package delivery obligation of the multiple outstanding package delivery obligations relative to a direct route for transporting the end user from one or more rendezvous locations to one or more end user destination locations.

30. The system of claim 1, further comprising:
circuitry for determining a discounted transport fee rate to be charged for transporting the end user, the discounted fee rate being based, at least in part, on determining that one or more package deliveries will be made during transport of the end user.

31. The system of claim 30, wherein said circuitry for determining a discounted transport fee rate to be charged for transporting the end user, the discounted fee rate being based, at least in part, on determining that one or more package deliveries will be made during transport of the end user comprises:
circuitry for determining the discounted transport fee rate to be charged for transporting the end user, the discounted fee rate being based, at least in part, on a sliding scale where the discounting of a nominal transport fee rate to generate the discounted transport fee rate is greater when there is greater number of package deliveries to be made during transport of the end user by the transportation vehicle unit.

32. The system of claim 1, further comprising:
circuitry for presenting, in response to verification that the one or more end user transport requests do not conflict with the one or more package delivery requests, one or more instructive directives that direct the transportation vehicle unit to transport the end user.

33. The system of claim 32, wherein said circuitry for presenting, in response to verification that the one or more end user transport requests do not conflict with the one or more package delivery requests, one or more instructive directives that direct the transportation vehicle unit to transport the end user comprises:
circuitry for presenting one or more instructive directives that direct the transportation vehicle unit to transport the end user and that further directs the transportation vehicle unit to deliver one or more packages during transport of the end user.

34. The system of claim 33, wherein said circuitry for presenting one or more instructive directives that direct the transportation vehicle unit to transport the end user and that further directs the transportation vehicle unit to deliver one or more packages during transport of the end user comprises:
circuitry for presenting one or more instructive directives that provide a list of one or more packages that can be selected for delivery to one or more package delivery locations during transport of the end user by the transportation vehicle unit.

35. The system of claim 34, wherein said circuitry for presenting one or more instructive directives that provide a list of one or more packages that can be selected for delivery to one or more package delivery locations during transport of the end user by the transportation vehicle unit comprises:
circuitry for presenting one or more instructive directives that provide a list of two or more packages that can be potentially selected for deliveries to two or more package delivery locations during transport of the end user by the transportation vehicle unit, the list ranking the packages based on the package delivery locations associated with each of the listed packages.

36. The system of claim 32, wherein said circuitry for presenting, in response to verification that the one or more end user transport requests do not conflict with the one or more package delivery requests, one or more instructive directives that direct the transportation vehicle unit to transport the end user comprises:
circuitry for presenting a discounted transport fee rate for transporting the end user, the discounted fee rate being based, at least in part, on the transportation vehicle unit making one or more package deliveries during transport of the end user.

37. A system, comprising:
at least one processor device; and
one or more instructions that, when executed by the at least one processor device, specifically program the at least one processor device for:
receiving end user preference data indicating one or more preferences of an end user related to package deliveries to occur during transport of the end user;
receiving one or more end user transport requests, at least partly via at least one end user device associated with an end user, that request a transportation vehicle unit to transport the end user;
confirming that transport of the end user by the transportation vehicle unit in accordance with the end user transport request will not violate one or more package delivery obligations of the transportation vehicle unit; and
electronically transmitting navigation instructions to a navigation system associated with the transportation vehicle unit directing the transportation vehicle unit to rendezvous with the end user responsive to the confirming.

38. A method for controlling a robotic driver system, comprising:
receiving end user preference data indicating one or more preferences of an end user related to package deliveries to occur during transport of the end user;
receiving one or more end user transport requests, at least partly via at least one end user device associated with an end user, that request a transportation vehicle unit to transport the end user;
confirming that transport of the end user by the transportation vehicle unit in accordance with the end user transport request will not violate one or more package delivery obligations of the transportation vehicle unit; and
electronically transmitting navigation instructions to a navigation system associated with the transportation vehicle unit directing the transportation vehicle unit to rendezvous with the end user responsive to the confirming.

* * * * *